(12) United States Patent
Gourley

(10) Patent No.: US 11,796,224 B2
(45) Date of Patent: Oct. 24, 2023

(54) SOLAR FLUID HEATER INSTALLATION SYSTEM

(71) Applicant: PlexiSun Limited, Auckland (NZ)

(72) Inventor: Richard Lecky Gourley, Whiritoa (NZ)

(73) Assignee: PlexiSun Limited, Auckland (NZ)

( * ) Notice: Subject to any disclaimer, the term of this patent is extended or adjusted under 35 U.S.C. 154(b) by 653 days.

(21) Appl. No.: 17/045,158

(22) PCT Filed: Apr. 4, 2019

(86) PCT No.: PCT/IB2019/052787
§ 371 (c)(1),
(2) Date: Oct. 2, 2020

(87) PCT Pub. No.: WO2019/193550
PCT Pub. Date: Oct. 10, 2019

(65) Prior Publication Data
US 2021/0033310 A1    Feb. 4, 2021

Related U.S. Application Data

(60) Provisional application No. 62/652,866, filed on Apr. 4, 2018.

(51) Int. Cl.
| | | |
|---|---|---|
| *F24S 25/632* | (2018.01) | |
| *F24S 25/67* | (2018.01) | |
| *F24S 25/60* | (2018.01) | |
| *F24S 25/20* | (2018.01) | |
| *F24S 23/70* | (2018.01) | |
| *F24S 25/00* | (2018.01) | |
| *E04B 7/18* | (2006.01) | |
| *F24S 80/30* | (2018.01) | |

(Continued)

(52) U.S. Cl.
CPC ............. *F24S 25/632* (2018.05); *E04B 7/18* (2013.01); *F24S 25/67* (2018.05); *F24S 2025/6007* (2018.05)

(58) Field of Classification Search
CPC . E04B 7/18; F24S 10/748; F24S 20/67; F24S 2020/12; F24S 2023/831; F24S 2025/022; F24S 2025/6007; F24S 2025/801; F24S 25/20; F24S 25/632; F24S 25/67; F24S 80/30; Y02B 10/20; Y02E 10/44; Y02E 10/47
See application file for complete search history.

(56) References Cited

U.S. PATENT DOCUMENTS 4,155,346 A * 5/1979 Aresty .................... F24S 80/30
285/31
4,205,658 A    6/1980 Clark
(Continued)

*Primary Examiner* — Jorge A Pereiro
*Assistant Examiner* — Logan P Jones
(74) *Attorney, Agent, or Firm* — Loginov & Associates, PLLC; William A. Loginov

(57) ABSTRACT

This invention provides a solar fluid heating panel with fluid conduits that allow a fluid to be heated by the sun. It also provides a mounting system and weather sealing system that allow the panels to replace a traditional roof. The roof replacing panels can be installed quickly using mounting brackets attached to roof purlins. The panels can allow natural ambient light to enter the building while harnessing the sun's energy to heat fluid within the conduits.

6 Claims, 42 Drawing Sheets

(51) Int. Cl.
*F24S 20/00* (2018.01)
*F24S 10/70* (2018.01)

(56) References Cited

U.S. PATENT DOCUMENTS

| | | | | |
|---|---|---|---|---|
| 4,249,519 | A * | 2/1981 | Martinez | F24S 80/70 |
| | | | | 126/569 |
| 4,353,356 | A * | 10/1982 | Vandenbossche | F24S 80/30 |
| | | | | 126/648 |
| 4,498,265 | A * | 2/1985 | Leflar | F24S 80/70 |
| | | | | 52/204.591 |
| 8,333,185 | B1 | 12/2012 | Gourley | |
| 2007/0125016 | A1 | 6/2007 | Yu | |
| 2009/0025710 | A1 | 1/2009 | Hogan | |
| 2011/0000544 | A1* | 1/2011 | West | H01L 31/048 |
| | | | | 136/252 |
| 2014/0182678 | A1 | 7/2014 | Chiu | |

\* cited by examiner

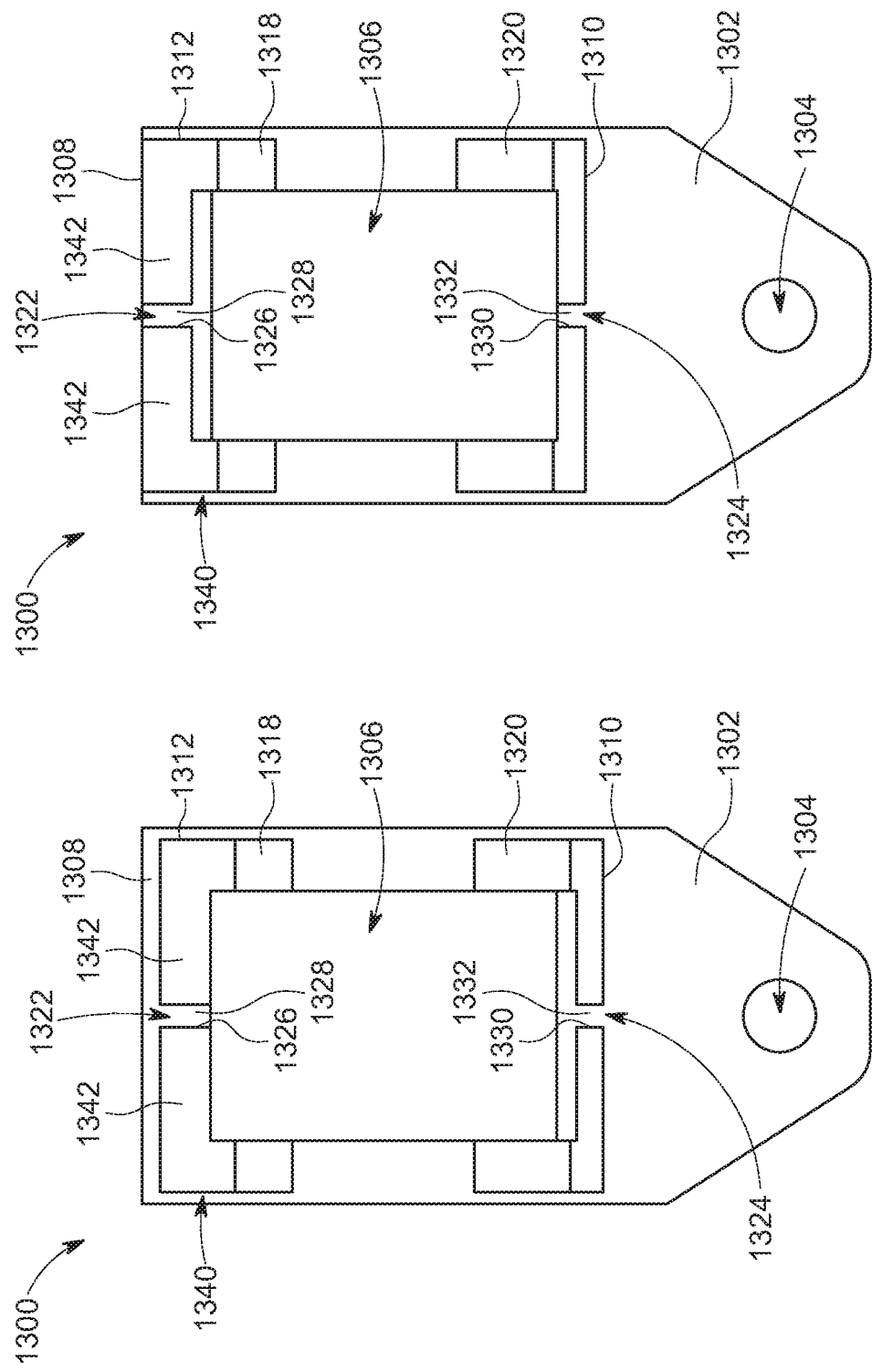

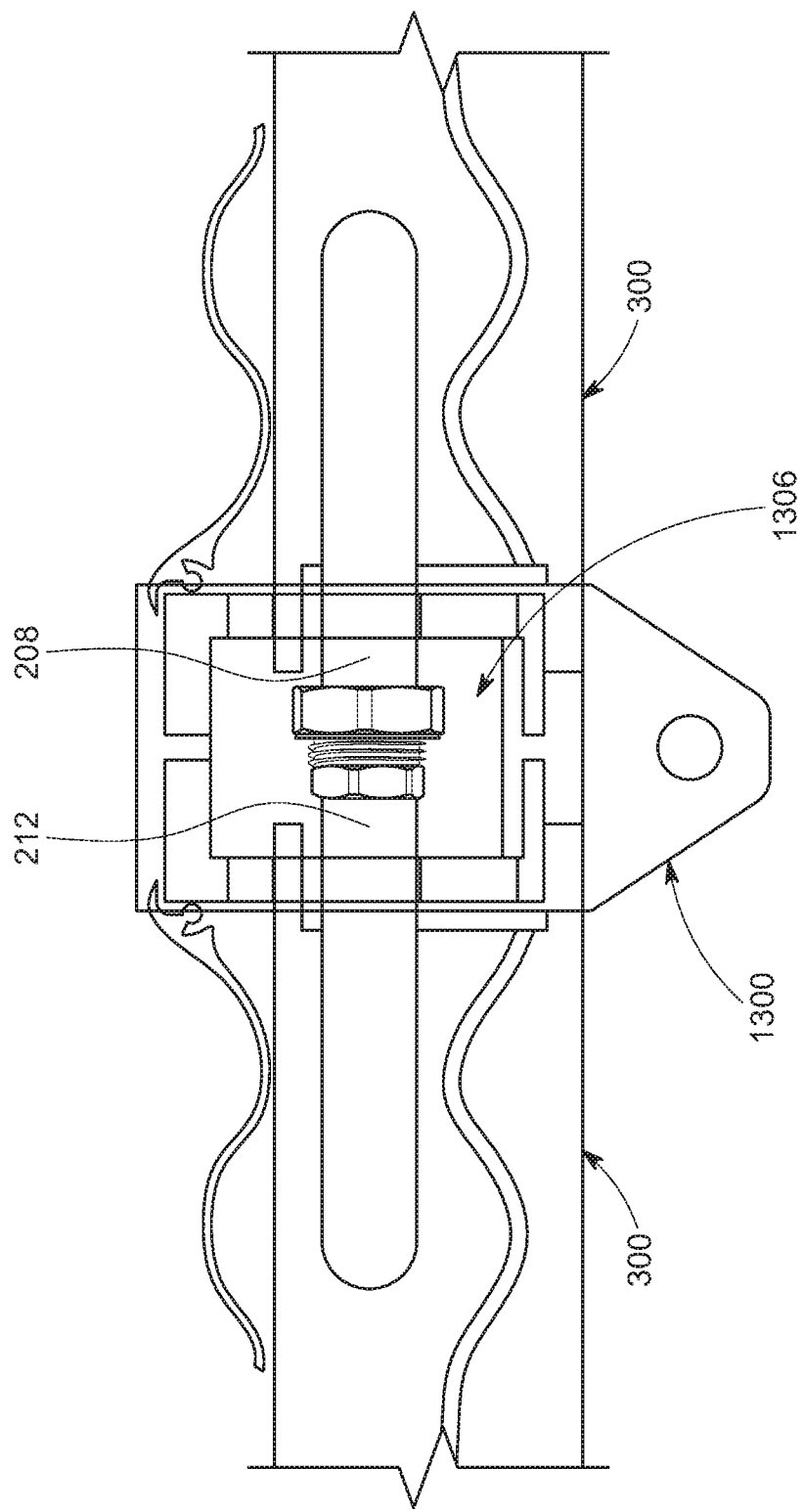

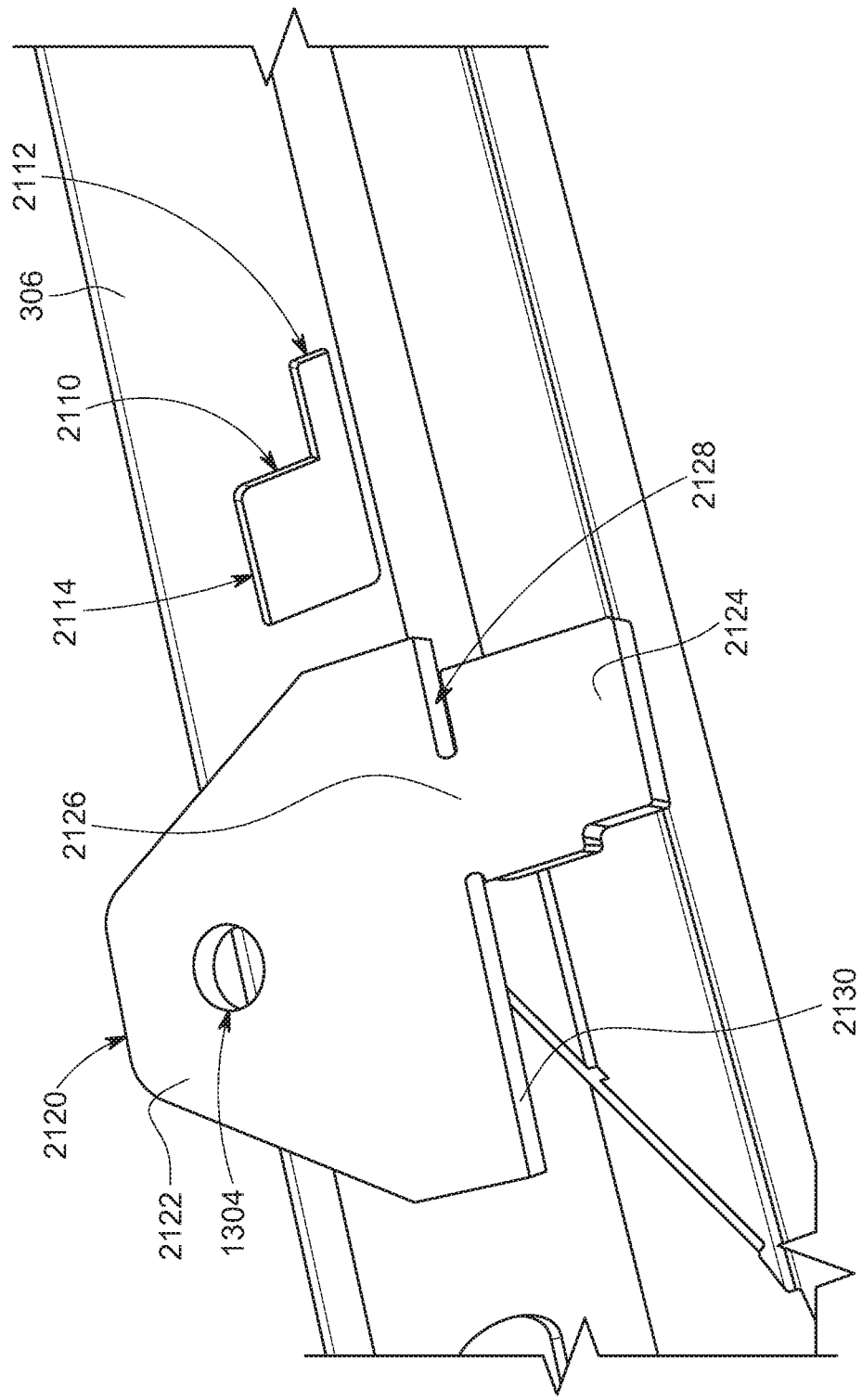

SOLAR FLUID HEATER INSTALLATION SYSTEM

FIELD OF THE INVENTION

This invention relates to solar powered fluid heating and to installation of solar powered fluid heating roofs and structures.

BACKGROUND OF THE INVENTION

The demand for energy is forever on the rise, and the traditional fossil fuel resources that provide it are of a finite supply. Also, the burning of such fuels contributes to atmospheric pollution and leads to the production of carbon dioxide, which is suspected to accelerate the greenhouse effect and lead to global warming or climate change. Sun as an energy source is inexhaustible and is becoming increasingly popular due to its cleanliness and availability.

In some settings it may be particularly advantageous to use solar energy to heat water supplies. A large number of solar heating arrangements, both proposed and in-use today, incorporate mechanisms for solar heating water into panels. Many commercial solar heaters exist which may be installed on house roofs for example. Freestanding or fence-style panels are also known. For example, commonly owned U.S. Pat. No. 8,333,185 to Gourley, incorporated herein by reference in its entirety, teaches an arrangement of interconnected sections that harvest solar energy from the sun to heat a fluid. U.S. Pat. No. 4,164,933 entitled CONCRETE SOLAR COLLECTORS to Alosi, the teachings of which are incorporated by reference by way of further background, proposes a concrete solar collector panel. The panel is developed with passageways which serve as a conduit for conveying a fluid. A plurality of panels can be connected, and can be employed as a fence to receive radiant energy from the sun and transfer the collected heat to the fluid flowing within each of the panels. Also, U.S. Pat. No. 4,562,884 entitled HEAT-EXCHANGER ARRANGEMENT to Gebriider Uhl, the teachings of which are also incorporated by reference by way of further background, proposes a solar heat absorber including a plurality of heat exchange elements which are provided with external fins and have internal flow through passages for fluid. The passages communicate with internal channels of collector pipes. The collector pipes are in turn connected by respective corner members to connecting pipes to form a frame. A plurality of such frames can be arranged next to one another to form a fence with heat exchanging capability. In addition, U.S. Pat. No. 5,572,988 entitled SOLAR ABSORBER ASSEMBLIES to Neumann Steel Pty Ltd, also incorporated herein by reference by way of further background, proposes a solar absorber assembly having connectors between which tubes extend for conveying water to be heated. The tubes are surrounded by a glazing assembly which is supported by the connectors. The connectors may be connected with adjacent connectors of adjacent assemblies to form a fence panel.

Solar water heaters can also be installed on existing roofs, where they can collect solar energy at an efficient angle and provide that energy to the inside of the building below. However, they often require extensive assembly, and care must be taken to avoid damage to the existing roof. It is therefore desirable to provide a solar water heating assembly which overcomes as least some of the disadvantages of the prior art, by generally increasing the speed and convenience of assembly, reducing concerns for damaging a traditional roof structure, while providing solar energy to the occupants of the building.

SUMMARY OF THE INVENTION

This invention overcomes the disadvantages of the prior art by providing a solar fluid heating assembly that can include pre-built modular panels that can be assembled together quickly and securely to harvest solar energy. The solar fluid assembly can be secured directly to roof purlins, and can provide a water-tight replacement for a traditional roof. This replacement for a traditional roof can also allow sunlight to pass directly into the building below.

In an illustrative embodiment, a solar fluid heating roof can have a plurality of panels, and at least one mounting bracket. The panels can have a fluid conduit, a quadrilateral frame having two side members, the side members having an outer wall, open ends, and a c-channel on an exterior of an inner face, a corrugated top sheet, and a flashing strip, The flashing strip can have a ridge, the ridge slidably engaged with the c-channel, a frame lip, the frame lip overlaying an upper corner of the side member; and a tail, the tail overlaying and contacting a portion of the corrugated top sheet. The at least one mounting bracket can have a plate, a plurality of top shelves extending outward from the plate, the top shelves engaged within the open ends of side members of panels, a plurality of lower feet, the lower feet engaged within the open ends of side members of panels, at least one shelf gap between top shelves, at least one foot gap between lower feet, a mounting hole through the plate, and an access hole through the plate between the top shelves and the lower feet. The top shelves on a first mounting bracket can be engaged with side members of different panels, and the lower feet on the first mounting bracket can be engaged with side members of different panels, and a portion of the ends of the outer walls of two adjacent panels can be within the shelf gap and the foot gap of the first mounting bracket.

The mounting bracket can have a plurality of sidewalls extending outward from the plate between the top shelves and the lower feet. The sidewalls can define cutouts, and the cutouts can form a break in the sidewalls between the top shelves and the feet. The mounting bracket can have four top shelves, with a first top shelf and a second top shelf on a first side of the plate, and a third and fourth top shelf on a second side of the plate. The flashing strip can have a substantially continuous profile from a first end of the flashing strip to a second end of the flashing strip. The frame lip can have a 90-degree channel, and the frame lip can contact two sides of the upper corner of the side frame member.

In an embodiment, a mounting bracket can have a plate having bolt hole, and at least two mounting units, with a first mounting unit and a second mounting unit on a first side of the plate. The mounting units can have an upper shelf, and a foot, the upper shelf and the foot extending outwards from the mounting plate, and the first mounting unit and the second mounting unit can be separated by a gap. The plate can have an access hole through the plate between the shelf and the foot. The first mounting unit and the second mounting unit are separated by a gap, and wherein the plate has an access hole through the plate between the shelf and the foot. The mounting units can have a sidewall, and the sidewall can extend at least partially from the side of the shelf to the side of the foot. The sidewall can define a cutout, and the cutout can form a break in the sidewall between the shelf and the foot. The mounting bracket can have a third mounting unit and a fourth mounting unit, with the third and fourth mounting units on the second side of the plate. A portion of the cutout can be defined by a guide face, and the guide face can be at an angle of approximately 45 degrees relative to the plate. A portion of the cutout can be defined by a lower ramp, and the lower ramp can be between a leading facet of a foot and the plate. The lower ramp is at an angle of approximately 45 degrees relative to the plate.

In an embodiment, a flashing strip can have a ridge having an end region and a stem, the stem narrower than the end region, a lip, and a tail extending away from the ridge and the lip, wherein the flashing strip has a profile that is substantially continuous along the length of the flashing strip. The lip can have an approximately 90-degree channel, the lip shaped to make contact with two sides of a 90-degree corner at the same time. The flashing strip can have at least one indent, wherein the indent at least partially defines the stem. The tail can have a curve approximately the shape of a sine wave. The tail can extend from a local maximum to near a local minimum of a sine wave. The tail can extend from the ridge downward to a local minimum and continue up and over a local maximum.

BRIEF DESCRIPTION OF THE DRAWINGS

The invention description below refers to the accompanying drawings, of which:

FIG. 13B is a front view of the mounting bracket for installation of one or more solar fluid heating panels of FIG. 13A, according to an illustrative embodiment;

FIG. 13C is a rear view of the mounting bracket for installation of one or more solar fluid heating panels of FIG. 13A, according to an illustrative embodiment;

FIG. 17 is an end view of two partially-cut away neighboring panels supported by a mounting bracket, according to an illustrative embodiment;

FIG. 21A is a perspective view of a side frame member and a mounting plate, according to an illustrative embodiment;

DETAILED DESCRIPTION

Figure 1A:
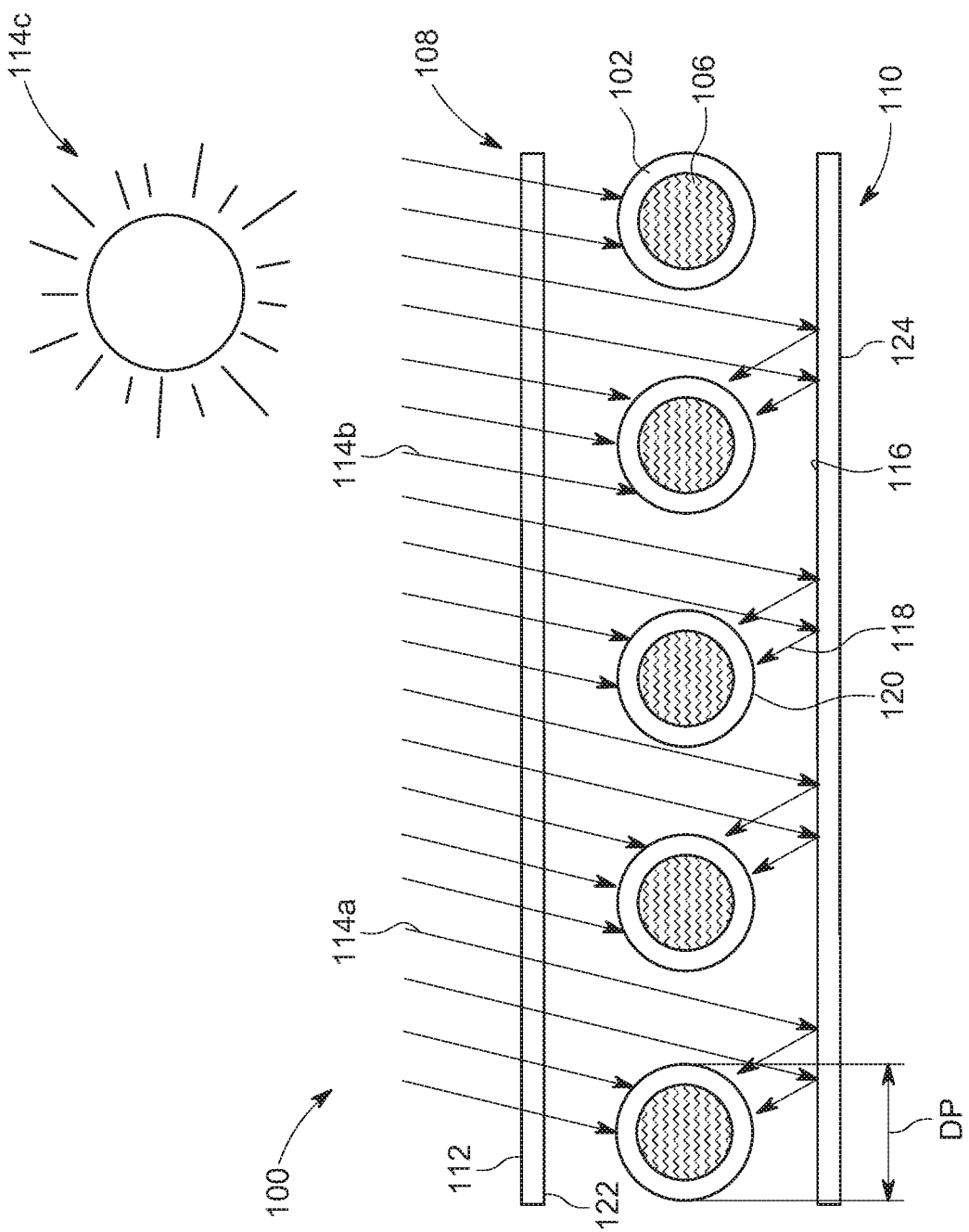
FIG. 1A is a schematic cross section of a solar fluid heating panel according to an illustrative embodiment featuring flat, planar panels which illustrates the passage of solar heat energy therethrough.

Referring to FIG. 1A, in a first illustrative embodiment of the invention a solar fluid heating assembly 100 is provided comprising one or more conduits 102, which illustratively contain fluid 106, the conduits 102 being sandwiched between a first sheet 108 and a second sheet 110, wherein at least one outwardly facing portion 112 of the first sheet 108 is substantially transparent to solar heat energy (arrows 114a), derived from the sun 114c, passing therethrough in the direction of the conduits 102 and at least one portion of the inner surface 116 of the second sheet 110 orientated towards the conduits 102 is substantially reflective of solar heat energy (arrows 114b). Although first sheet 108 is described herein as transparent, in various embodiments first sheet 108 can be translucent or can have various tints.

In use, according to illustrative embodiments, fluid 106 passing through (under flow pressure), or contained within, the conduits 102 is heated both by heat energy (arrows 114a) which passes through transparent sheets 108 and directly strikes conduits 102 but also by heat energy (arrows 114b), which strikes the reflective surface 116 behind the conduits 102 and is reflected (arrows 118) back to the conduits 102 onto surfaces 120 that face away from the sun. Thus, the efficiency of heating is greatly enhanced. More generally, the conduits 102 may contain any fluid, such as any known liquid or gas capable of flowing through the conduits and capable of absorbing and transferring heat energy. The term "contain," as used herein (such as in the phrase "contain a fluid"), refers generally to defining the area where a fluid may flow, but, as would be apparent to those of skill in the art, the fluid may still enter and exit the conduits 102 through, e.g., inlets and outlets. Likewise, the term "fluid" should be taken broadly to include (but not be limited to) a number of different liquid compounds and combination of compounds, such as a water, a water-glycol mixture, hydrocarbons, glycerin, water, etc. Furthermore, in the illustrative embodiment described herein, the solar fluid heating assembly serves to heat water because this is one example of a useful application of this invention. The solar fluid heating assembly may also serve to heat other liquids or gases (fluids), however, where such applications are desirable.

The conduits can define an opaque (e.g. flat black) surface, or can be tinted black or even transparent in various embodiments. Likewise, in any of the embodiments herein, the inner surface 122, 116 of either (or both) respective sheets 108, 110 can be coated entirely or partially with a reflective coating that enables the majority of the radiation to pass into the interior of the assembly, but enhances bounce-back from the inner surface (in the manner of a "one-way" mirror).

Although the first or exterior sheet 108 may within the scope of the invention be omitted, it is desirable to provide such a sheet as it offers protection from wind-chill and other weather-related elements. The chilling effect of air movement across conduits 102 can significantly reduce the efficiency of solar heating. First sheet 108 can also be protective against impact damage to the conduits, and can improve the aesthetic appearance of the overall heater assembly according to the various embodiments herein.

The sheets 108 and 110 may be of any suitable shape. In FIG. 1A second sheet 110 is flat. Since even if the assembly 100, as is highly desirable, is installed so as to receive a maximum amount of sunlight on first sheet 108, the rays will rarely be exactly perpendicular to the plane of the sheet, and the flat, second sheet 110 will still reflect some heat radiation (arrows 118) onto the conduits 102, as shown in FIG. 1A. The sheets 108 and 110 can be parallel to each other, as illustrated in FIG. 1A, or they can be situated in intersecting planes (i.e., non-parallel) in alternate embodiments. For example, in an alternate embodiment, the conduit can taper into a narrower width near one edge of the sheets, illustratively to affect the pressure level of the fluid near an outlet, and the sheets in this embodiment may be mounted in a non-parallel fashion such that the distance between them likewise decreases to match the narrowing of the conduit.

Figure 1B:
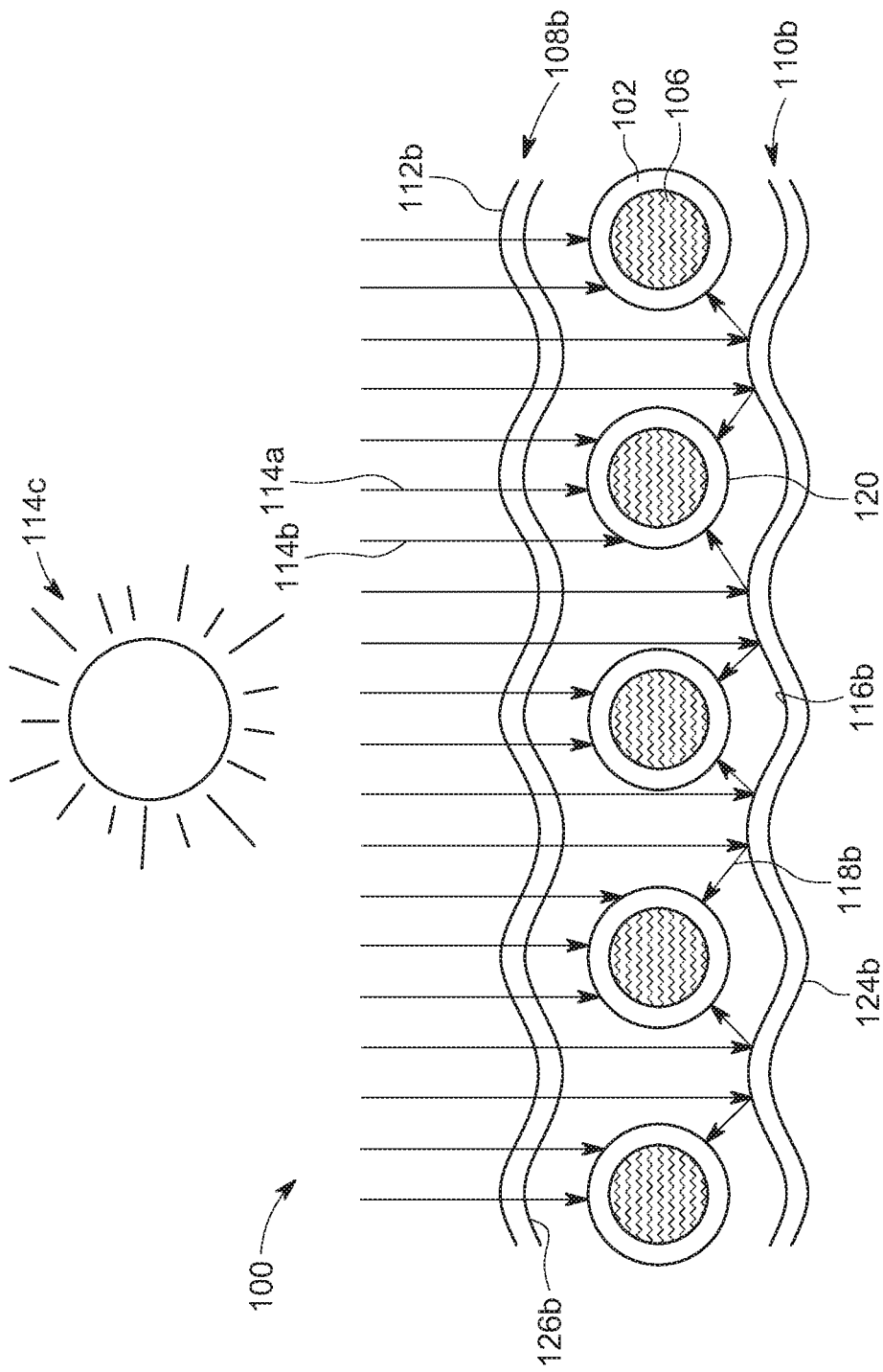
FIG. 1B is a schematic cross section of a solar fluid heating panel according to one illustrative embodiment featuring corrugated sheets which illustrates the passage of solar heat energy therethrough.

FIG. 1B is a schematic cross section of a solar fluid heating panel according to one illustrative embodiment featuring corrugated sheets which illustrates the passage of solar heat energy therethrough. In at least one illustrative embodiment of the fluid heating panel, the second (interior) sheet 110b defines a curved, or desirably, corrugated surface shape as shown in the cross section of FIG. 1B. This surface shape of interior sheet 110b can be approximately in the shape of a sine wave or sinusoid curve. The curved or corrugated surface shape of the interior sheet 110b allows for the heat generating rays (arrows 114a and 114b) to be particularly efficiently reflected (arrows 118b) at a range of angles including onto the back 120 of the fluid-carrying conduits 102, and may also at least partially compensate for variations in the angle of incoming heat radiation (arrows 114a, 114b) caused by the sun's movement during the day. Note that the first or exterior sheet 108b also defines a curved or corrugated shape along its exterior surface 112b and interior surface 122b in this embodiment. In alternate embodiments, particularly where the sun tends to strike mainly on one sheet side, only the interior sheet is curved or corrugated. Moreover, angular facets can be employed on one or both sheets in alternate embodiments. As a further alternate embodiment, the exterior and interior sheets can define different shapes (e.g. one being curved and the other being corrugated, one being faceted and the other flat, or the corrugations/facets having differing pitch/spacing on different sides). Likewise, the corrugations, facets or other repeating surface features can vary in pitch/spacing at differing points along the surface so that certain angles of incident sunlight are reflected to differing degrees along the sheet.

As a result of the reflection offered by second sheet 110 or 110b, the illustrative embodiments effectively convert those back surfaces 120 of the fluid-carrying conduits 102 that face away from the sun from being dormant to being heat generating. This has the benefit of bringing a clean and free natural energy generating resource into a more efficient, and therefore more competitive, position against some polluting and expensive energy options currently available.

As described generally above, the heat transparency and heat reflective properties of the sheets 108, 108b and 110, 110b may be achieved in any suitable manner for example by coatings. A particularly illustrative material for the second sheet 110, 110b is a coated acrylic such as that commercially available inter alia under the trade name PLEXIGLAS® HEATSTOP® available from Evonik Industries AG, of Germany, although other materials could be used. This material is normally used for roofing, skylights, awnings and the like with a coated surface orientated toward the sun. It can comprise a 3 mm-thick single sheet of white, translucent material. In such applications the coating offers protection against heat as it reflects a substantial proportion, around 68%, of the sun's energy while being transparent to light. In the illustrative embodiments a coated acrylic can be used for at least second sheet 110 with the heat-reflecting, coated surface 116 or 116b orientated toward the conduits 102. Preferably, the outer surface 124 of second sheet 110 is substantially opaque. PLEXIGLAS® HEATSTOP® has such a translucent/visually obscuring outer surface. It also allows for different colors for aesthetic/design reasons. It should be clear however, that an alternate material with desirable transmission properties can be used as equivalent materials.

Transparent sheet 108, 108b may be made of a transparent, uncoated PLEXIGLAS® sheet, a PLEXIGLAS Resist® sheet, or another suitable transparent material, including types of glass. In illustrative embodiments, the first sheet 108 is made of an ultraviolet-rated (UV protecting) material, such as an acrylic sheet, which protects the conduits 102 from damage from UV radiation while allowing the passage of substantial amounts of heat radiation.

Figure 2:
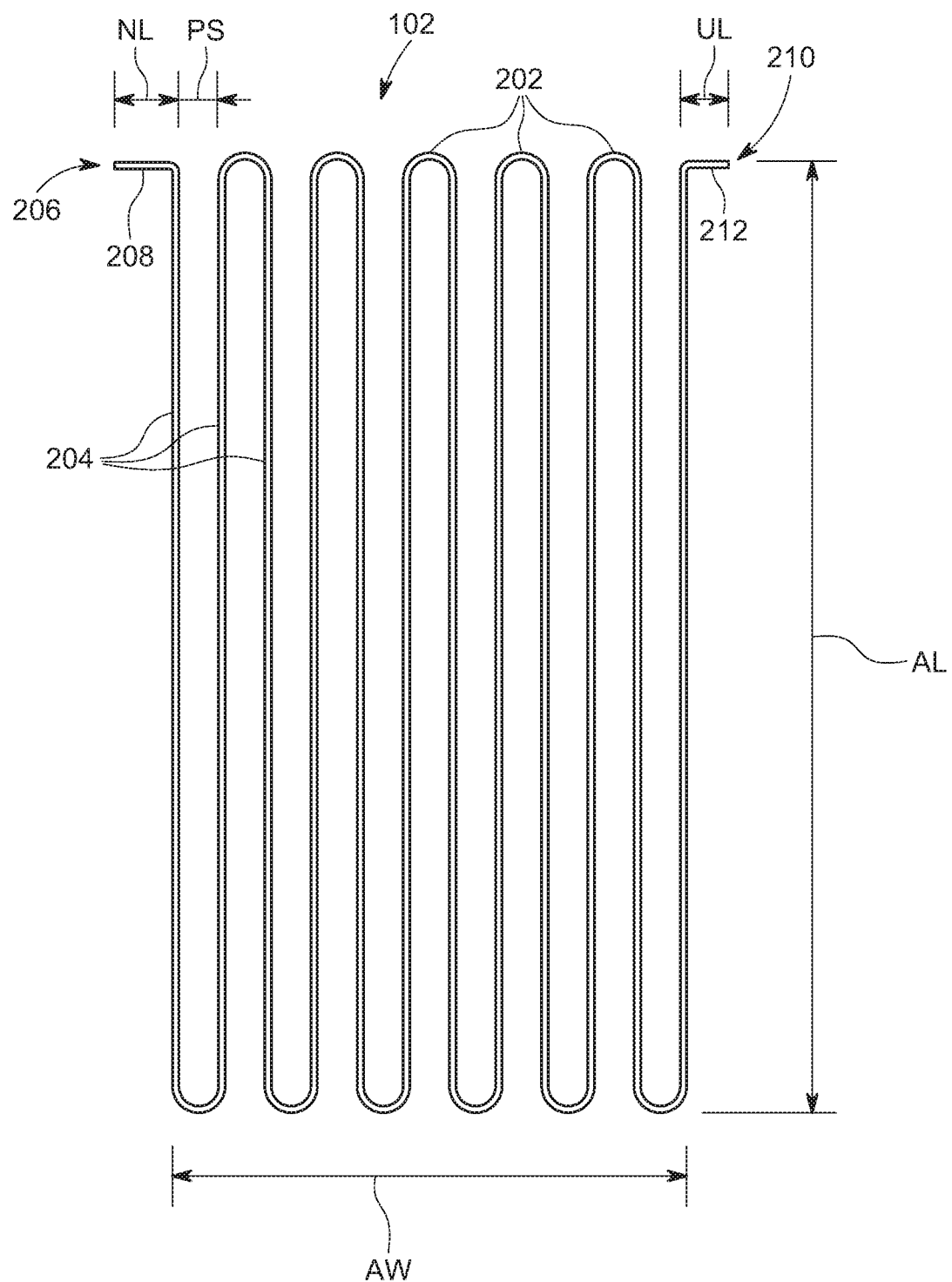
FIG. 2 is a top view of an illustrative arrangement of a fluid conduit for use in a solar fluid heating panel according to various embodiments of the invention.

FIG. 2 is a top view of an illustrative arrangement of a fluid conduit for use in a solar fluid heating panel according to various embodiments of the invention. As shown in FIG. 2, a conduit 102 can be arranged in a sinusoidal pattern within a solar fluid heating panel. A conduit can have a cold fluid inlet 206 that can be at the end of an inlet stem 208, and a heated fluid outlet 210 that can be at the end of an outlet stem 212. The sinusoidal (zigzag) conduit arrangement shown enables a large length to be incorporated into a compact solar fluid heating panel, although other arrangements are also possible as will be apparent to the skilled reader, and these are also envisaged and incorporated within the scope of the invention. Generally, according to the illustrative embodiment depicted in FIG. 2, the pipe sections extend approximately vertically as shown and can be joined by U-ends 202 at the ends of the vertical sections 204. The conduit arrangement can have an inlet port 206 that can be at the end of an inlet stem 208, and an outlet port 210 that can be at the end of an outlet stem 212. Inlet stem 208 and outlet stem 212 can extend outwards towards the sides of a panel so that the inlet port 206 and/or outlet port 210 can be connected to ports on neighboring panels.

By way of non-limiting example, the vertical pipe sections 204 can be spaced apart with a pipe spacing distance PS that can be approximately 7-8 cm. A width of the conduit arrangement AW can be approximately 83-84 cm, and a length of the conduit arrangement AL can be approximately 231 cm. An inlet stem 208 can have an inlet stem length NL that can be approximately 11-12 cm, and an outlet stem can have an outlet stem length UL that can be approximately 10 cm. However, it should be clear that the naming conventions "inlet" and "outlet" are not absolute, and fluid can flow either way through the system depending on which direction the fluid is pumped.

The inner and outer diameter of conduits utilized is highly variable depending upon the desired flow and system storage requirements. In an embodiment, the conduits 102 can be constructed using polymer or metal pipe having a standard plumbing diameter DP of between ½ inch and 2 inch (¾ inch in an illustrative embodiment), and adjacent conduits being spaced apart by a pipe-center-to-pipe-center spacing between approximately 2-4 inches (1⅝ inch in an illustrative embodiment). These dimensions and parameters are highly variable in alternate embodiments. The opposing side edges of the conduits are spaced approximately 1 inch from the adjacent inner faces of the panels 108, 108b, 110, 110b. This spacing is highly variable in alternate embodiments. Moreover, although FIG. 1 illustrates an embodiment wherein the conduits 102 are conventional round pipes with a perpendicular cross-section resembling a circle, the conduits can be of any form capable of containing fluid. For example, the conduits can be narrow channels between two flat panels of glass, such that the perpendicular cross-sectional shape of each conduit resembles a rectangle.

Figure 3:
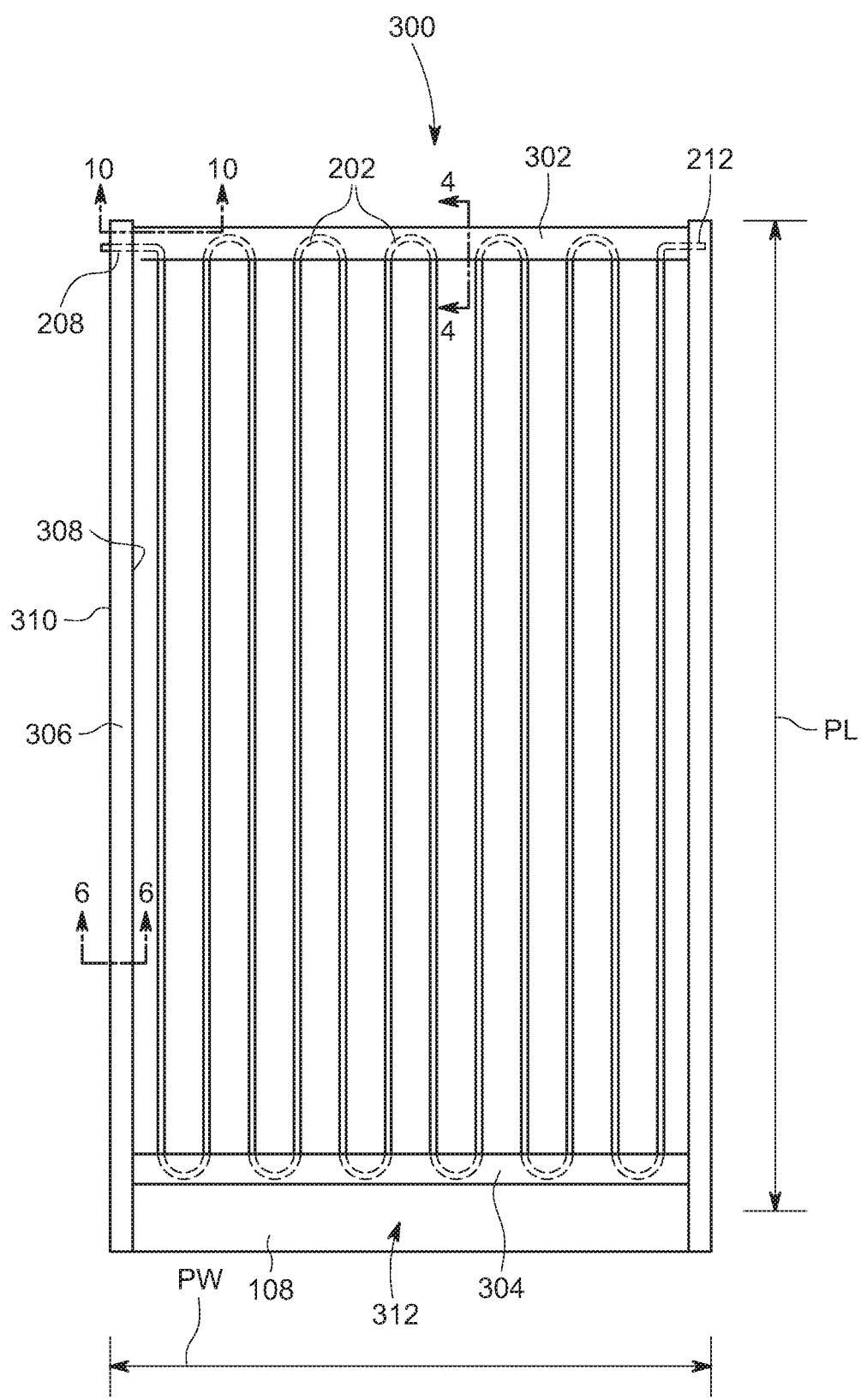
FIG. 3 is a top view of an assembled solar fluid heating panel, according to an illustrative embodiment.

FIG. 3 is a top view of an assembled solar fluid heating panel, according to an illustrative embodiment. Solar fluid heading panels can be designed to connect to neighboring panels so that the fluid within the conduits can be pumped from one panel to the next. The heated fluid can be pumped through multiple panels, and can be pumped through an entire circuit that can include a hot water storage tank, pipes located and arranged to heat the inside of a building, and/or other locations. Multiple panels connected together can form a panel array. The panels can be a replacement for a traditional roof, and a portion of one panel can overlap a portion of the panel below. A solar fluid heating panel 300 can have an upper frame member 302, a lower frame member 304, and side frame members 306. Side frame members 306 can have an inner surface 308 and an outer surface 310. A panel can have an overlap region 312 that can be designed to overlap a panel below. A first sheet 108 can cover the panel, and first sheet 108 can extend from the top of upper frame member 302 to the bottom of overlap region 312. U-ends 202 (shown in phantom) can be held within the upper frame member 302 and the lower frame member 304. Inlet stem 208 and outlet stem 212 can extend into side frame members 306. By way of non-limiting example, a panel 300 can have a panel length PL of approximately 220 cm, and panel width WL of approximately 106 cm.

The present disclosure includes various features such as overlap region 312 that can help to adapt the panels for use in a roof array, and also includes various features described further below that can help to adapt panels for use in fences or other applications. In various embodiments the panels can be installed in various places on the exterior of a building, such as a wall and/or roof, and/or can be one or more free standing panels together for use as stand-alone solar fluid heaters, and/or can be adapted for various uses such as fences. Various features described herein can be used to adapt panels for various uses including roofs and fences, and it should be clear to one skilled in the art that no single embodiment requires the inclusion of all of features described herein for adapting panels to various uses.

Figure 4:
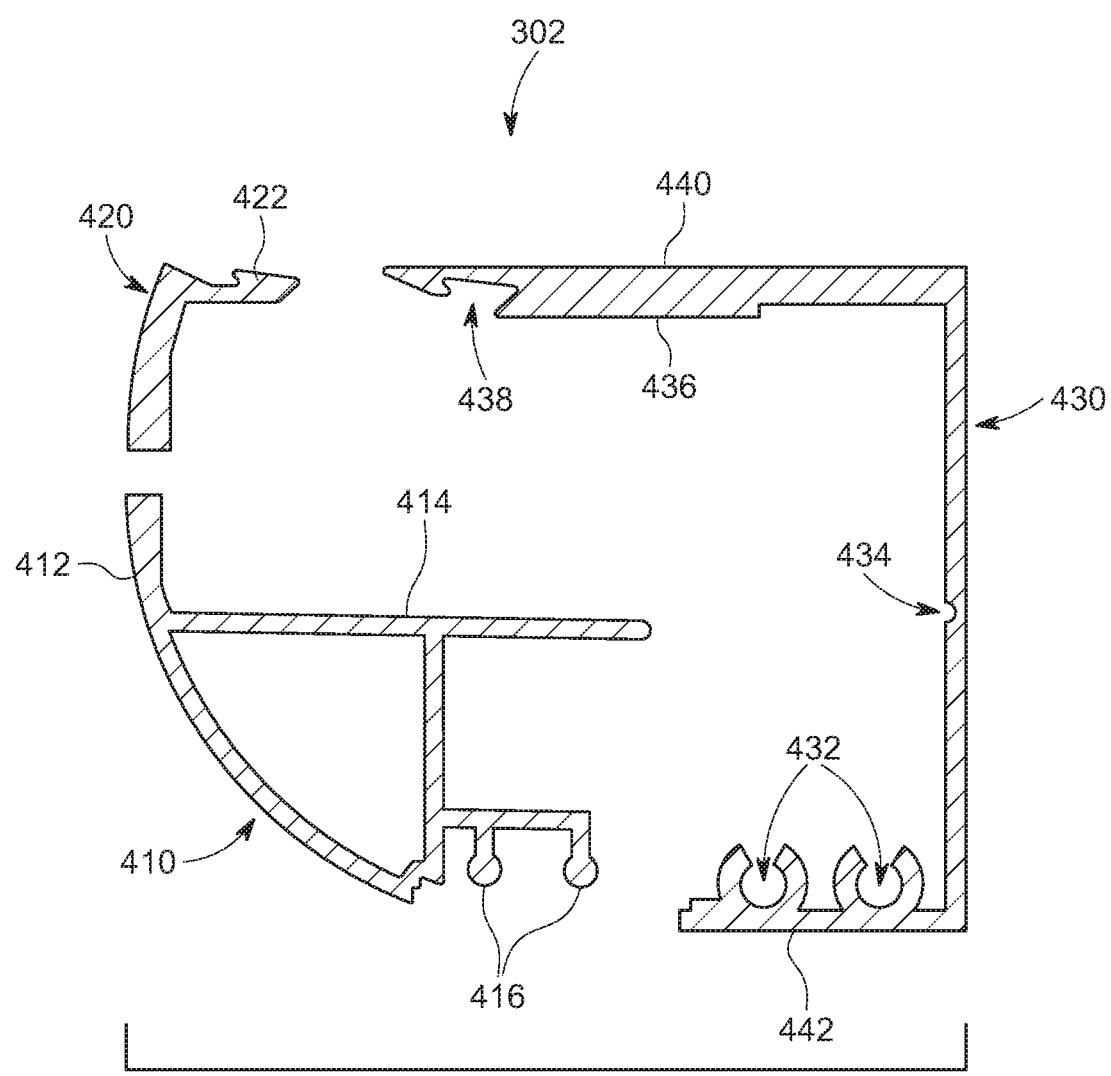
FIG. 4 is an exploded cross section view of an upper or lower frame member of a solar fluid heating panel, taken along cross-section line 4-4 of FIG. 3, according to an illustrative embodiment.

FIG. 4 is an exploded cross section view of an upper frame member of a solar fluid heating panel, taken along cross-section line 4-4 of FIG. 3, according to an illustrative embodiment. An upper frame member 302 can be assembled from a conduit supporter 410, a conduit holder 420, and a batten 430, each of which can be formed by an extrusion process, as is known in the art. A conduit supporter 410 can have an inner wall 412 that can have openings to accommodate the conduit 102 and the second sheet 110, and the conduit supporter 410 can have a conduit plate 414 that can support the U-ends 202. The conduit supporter can have at least one male engager 416 that can be cylindrical.

A batten 430 can have at least one female engager 432, and the male engager 416 and female engager 432 can be sized and shaped to slide together such that the batten 430 and conduit supporter 410 can be held together. The batten 430 can have a plate notch 434, and the conduit plate 414 can engage with the plate notch 434, so that the batten 430 can provide additional support to the conduit plate 414. The batten 430 can have a rib 436 that can be a thicker portion of the batten 430 to provide additional strength to the upper frame member 302, and the panel 300. The batten 430 can have a groove 438, and the conduit holder 420 can have a tongue 422. Tongue 422 can slide within groove 438 thereby holding the conduit holder 420 and batten 430 together. The upper frame member 302 can have an exterior wall 440 that can face towards the exterior of a building when panel 300 is installed, and an interior wall 442 that can face towards the interior of a building. Lower frame member 304 can be made of the same components and assembled in the same manner as upper frame member 302.

Figure 5:
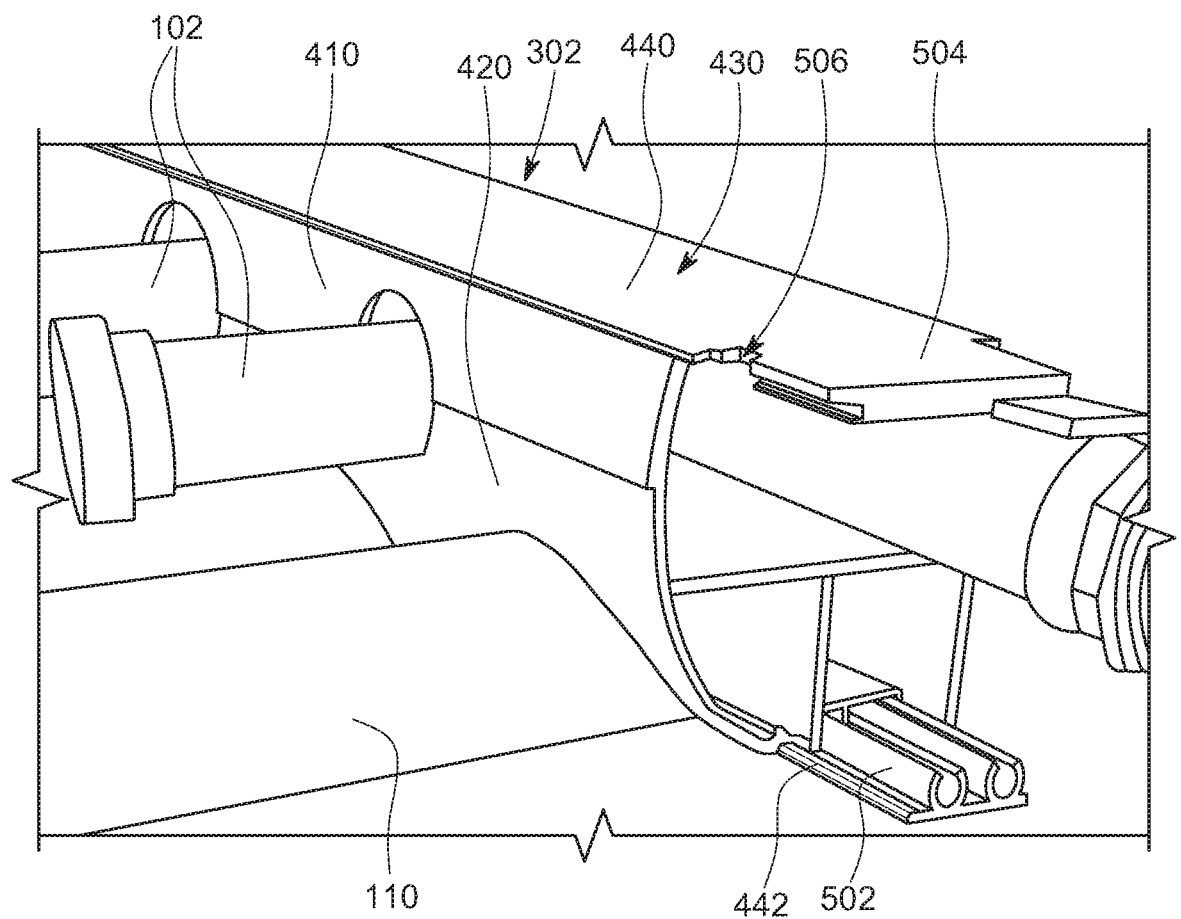
FIG. 5 is a perspective view of an assembled upper frame member, according to an illustrative embodiment.

FIG. 5 is a perspective view of an assembled upper frame member, according to an illustrative embodiment. Conduit supporter 410 and conduit holder 420 can have notches to accommodate the conduit 102, and can be assembled around conduit 102 as shown in FIG. 5. Second sheet 110 can be slid into a corresponding slit in the conduit supporter 410. Batten 430 can be slid into engagement with the conduit supporter 410 and conduit holder 420, with the at least one male engagers 416 engaged within the female engagers 432, and the tongue 422 engaged within the groove 438, as shown in FIG. 5. The U-ends 202 can be held within the upper frame member 302, and can rest on the conduit plate 414. At least a portion of the interior wall 442 can extend outwards to the side to form an interior tab 502, and at least a portion of the exterior wall 440 can extend outwards to the side to form an exterior tab 504. Exterior tab 504 can have a notch 506 that can be located near the end of the conduit holder 420. Upper frame member 302 can have tabs 502 and 504 on both sides, and inlet stem 208 and outlet stem 212 can extend outwards beyond tabs 502 and 504. It should be clear that the above description of components and assembly for the upper frame member 302 can also apply to the lower frame member 304 that can be made of similar components and assembled around the conduit in a similar manner.

Figure 6:
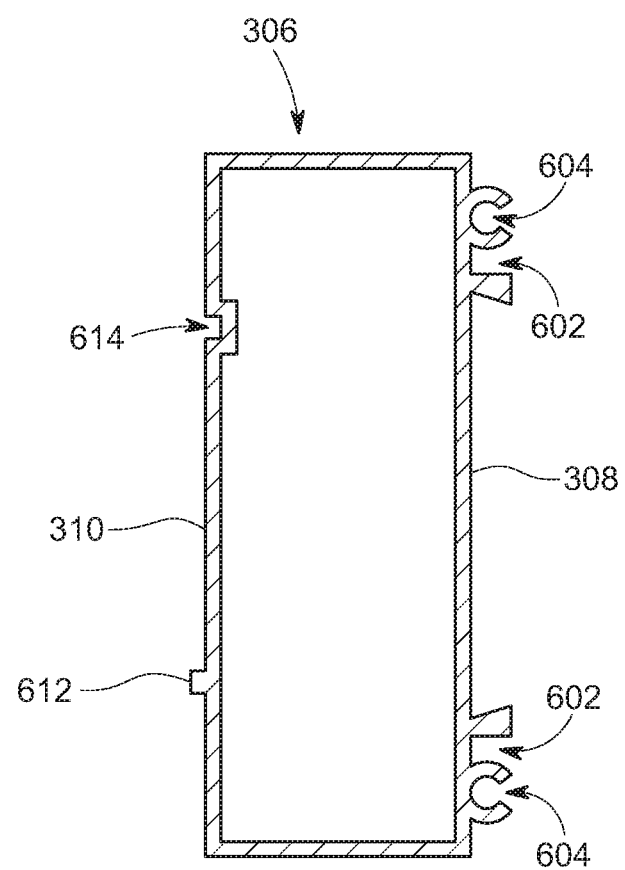
FIG. 6 is a cross section view of a side frame member of a solar fluid heating panel, taken along cross-section line 6-6 of FIG. 3, according to an illustrative embodiment.

FIG. 6 is a cross section view of a side frame member of a solar fluid heating panel, taken along cross-section line 6-6 of FIG. 3, according to an illustrative embodiment. A side frame member 306 can be extruded and can be hollow to reduce weight of the panel. The side frame member 306 can have an inner surface 308 and an outer surface 310. Inner surface 308 can have two sheet channels 602 and at least one flashing channel 604 that can be a C-channel. Sheet channels 602 can be adapted to engage with and hold the sides of the first sheet 108 and second sheet 110. Flashing channel 604 can allow a flashing strip to slide into engagement with the panel to prevent water from entering the panel, explained more fully below. Outer surface 310 can have a tongue 612 and a groove 614. Tongue 612 and groove 614 are adapted to engage with a corresponding tongue 612 and groove 614 on the side frame member of a neighboring panel 300 when two panels 300 are mounted next to each other. Side frame member 306 can be extruded with two flashing channels 604 at the top and bottom, as shown in FIG. 6, so that the same extrusion die can produce side frame members 306 for both sides of the panel.

Figure 7:
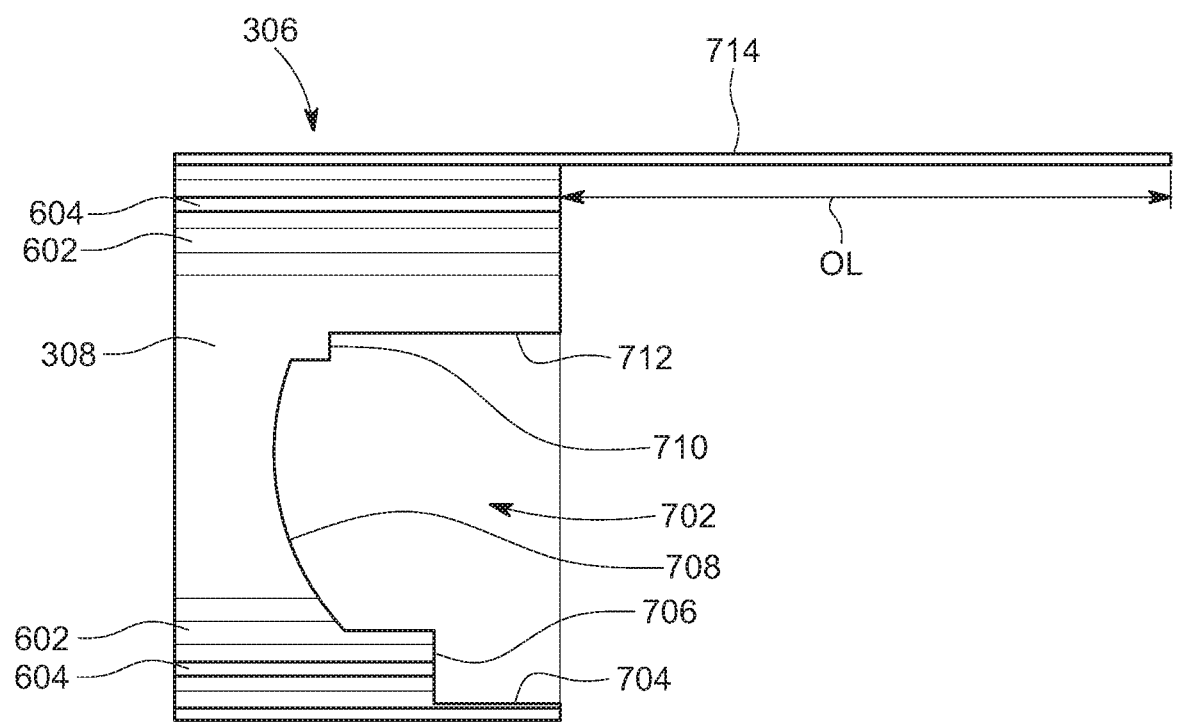
FIG. 7 is a view of an inner surface of the side frame member of FIG. 6, according to an illustrative embodiment.

FIG. 7 is a view of an inner surface of the side frame member of FIG. 6, according to an illustrative embodiment. The inner surface 308 can be partially cut away at both ends of the side frame member 306 to allow the side frame member 306 to be engaged with the upper frame member and lower frame member. Side frame member 306 has two inner cutouts 702 that can have a floor 704, a stop 706, an edge 708, a side tab 710, and a ceiling 712. Although only the lower end of the side frame member is shown, it should be clear that a similar cutout can be at the upper end of the side frame member for engagement with the upper frame member. Side frame member can also have one overhang 714 at the lower end of side frame member. Overhang 714 can be an extension of the top of side frame member 306, and can overlap over a neighboring panel 300 to prevent moisture from falling between the panels. Overhang 714 can have an overhang length OL of approximately 11 cm.

Figure 8:
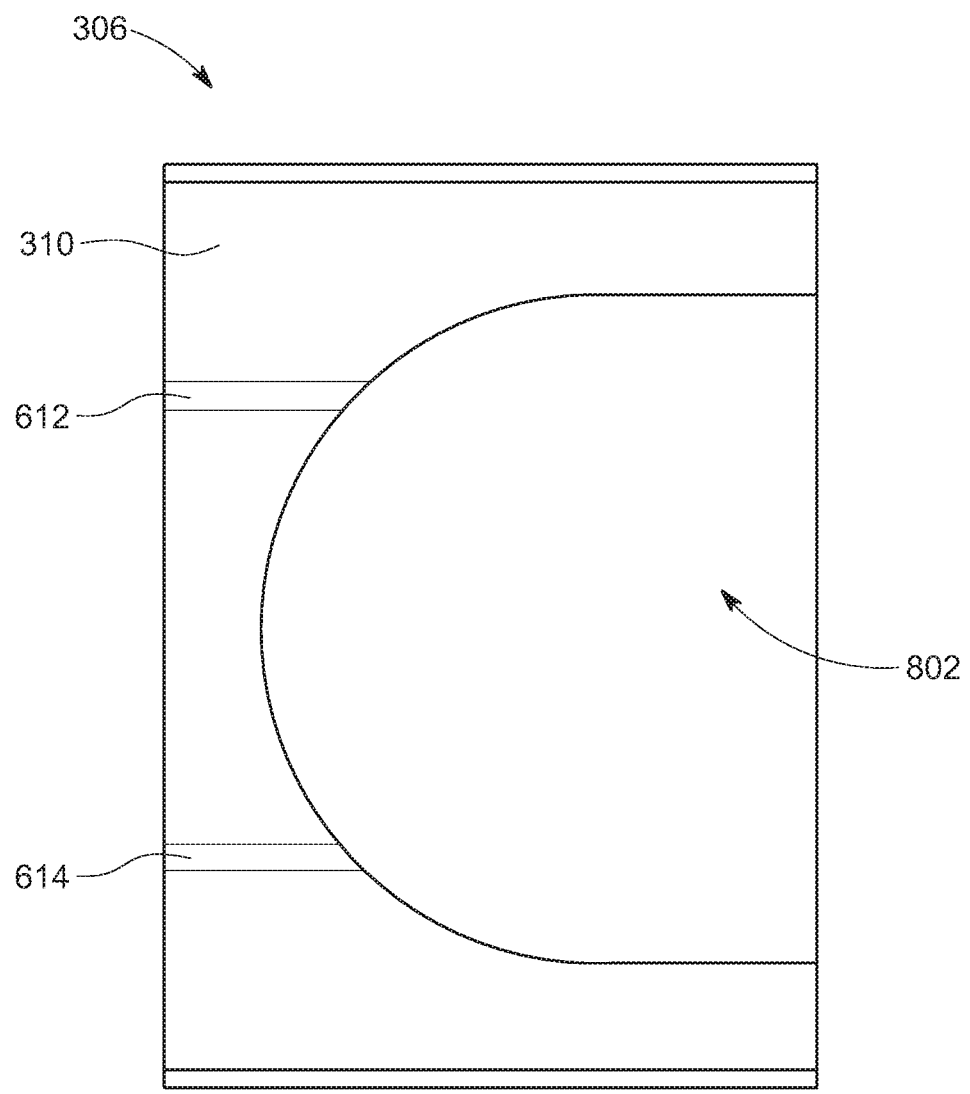
FIG. 8 is a view of an outer surface of the side frame member of FIG. 6, according to an illustrative embodiment.

FIG. 8 is a view of an outer surface of the side frame member of FIG. 6, according to an illustrative embodiment. The outer surface 310 can be partially cut away at at least the upper end of the side frame member 306. Outer cutout 802 can allow for the inlet port of a first panel to be connected to the outlet port of a neighboring panel. Outer cutout 802 can allow the inlet stem to extend out from the side of first panel 300 to meet the outlet port of the neighboring panel. Outer cutout 802 can have a diameter of approximately 72 mm so that it can allow free movement of a tool to connect the inlet and outlet together.

Figure 9:
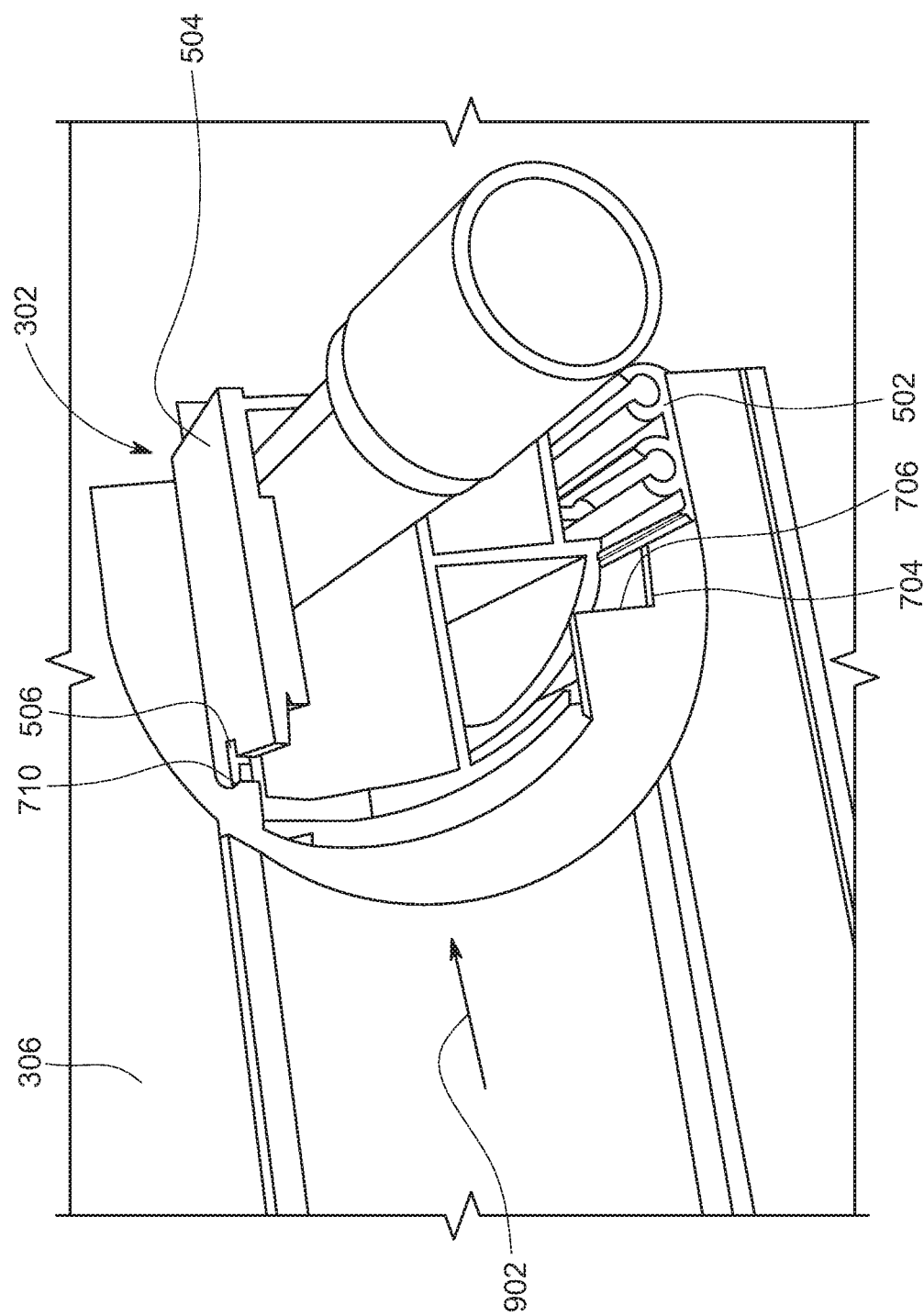
FIG. 9 is a perspective view of a partially assembled upper corner of a solar fluid heating panel, according to an embodiment.

FIG. 9 is a perspective view of a partially assembled upper corner of a solar fluid heating panel, according to an embodiment. The side of the upper frame member 302 can engage with the upper end of the side frame member 306. Interior tab 502 can rest on floor 704, side channel member 306 can move in the direction of arrow 902 to engage the upper frame member 302 with the side frame member 306. Interior tab 502 can rest against stop 706 when the frame members are engaged. Ceiling 712 can be above exterior tab 504, and side tab 710 can be slid into engagement with notch 506.

Figure 10:
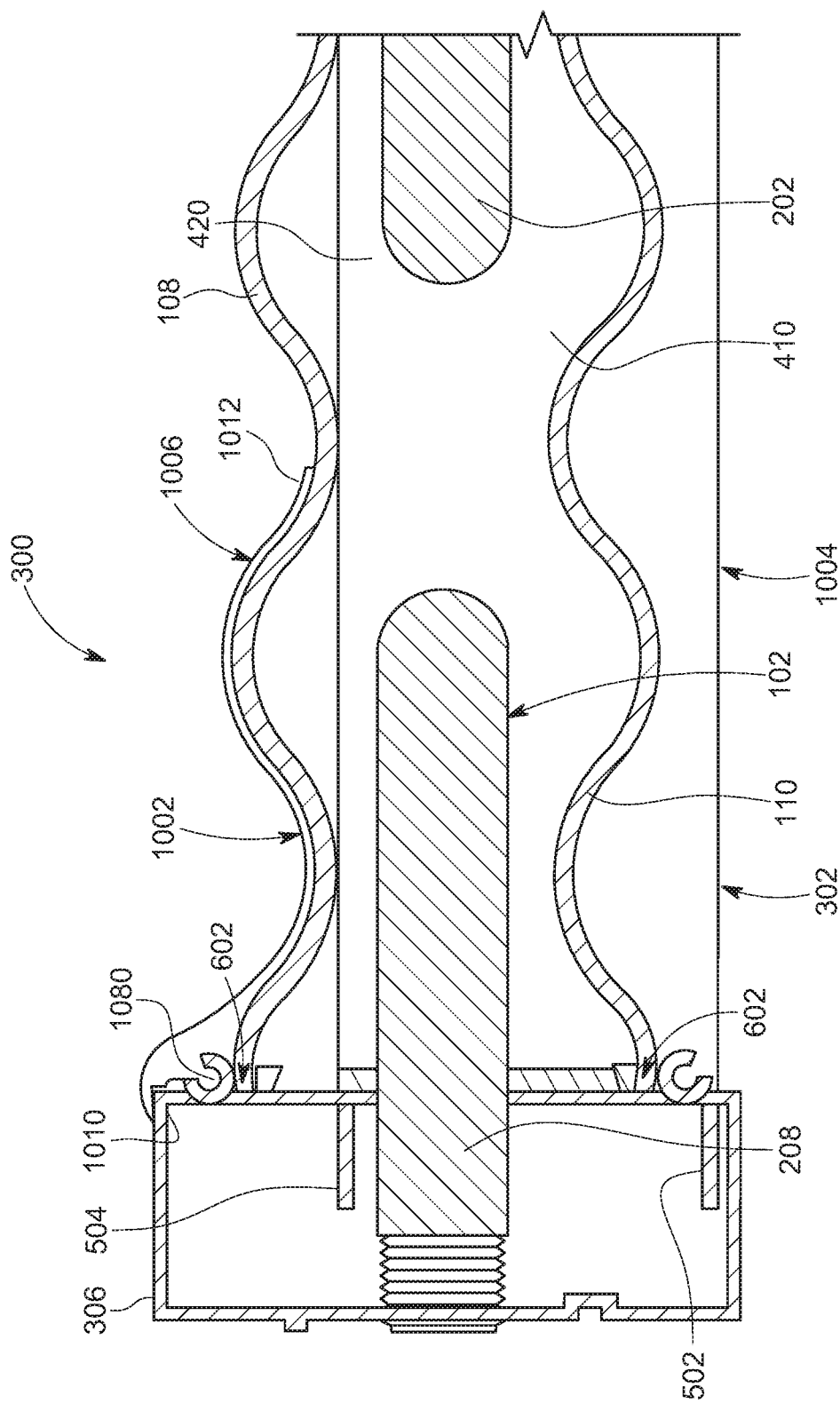
FIG. 10 is a cross section view of an upper corner of a solar fluid heating panel, taken along cross-section line 10-10 of FIG. 3, according to an illustrative embodiment.

FIG. 10 is a cross section view of an upper corner of a solar fluid heating panel, taken along cross-section line 10-10 of FIG. 3, according to an illustrative embodiment. Upper frame member 302 can be engaged with side frame member 306, and interior tab 502, exterior tab 504, and inlet stem 208 can extend into side frame member 306. The top of second sheet 110 can be engaged with upper frame member 302, and the side of second sheet 110 can be engaged with a sheet channel 602. Second sheet 110 can be supported and held in place by the upper frame member 302, lower frame member, and side frame members 306. The top of first sheet 108 can rest on the upper frame member 302, and the side of first sheet 108 can be engaged with a sheet channel 602. U-end 202 is supported by conduit supporter 410 and held in place by conduit holder 420.

Panel 300 can have an exterior 1002 that can be faced outwards towards the exterior of a building, and in interior 1004 that can face inwards towards the inside of a building. Panel 300 can have a flashing strip 1006, and flashing strip 1006 can have a profile designed to prevent rain or other moisture from entering the panel 300. Flashing strip 1006 can have a ridge 1008 that can be slid into flashing channel 604, and flashing channel 604 can hold the flashing strip 1006 in place. Ridge 1008 can have a wider end portion, and a narrower stem portion, so that ridge 1008 can be retained in a C-channel. Ridge 1008 can engage with the side frame member along the length of the side frame member. Flashing strip 1006 can cover the exterior of the panel from an inner exterior corner 1010 of the side frame member 306 to the top of first sheet 108. In an embodiment, flashing strip 1006 can have a tail 1012 that can be contoured to contact and rest on the top of first sheet 108. As shown in FIG. 10, tail 1012 can follow and cover at least one dip and at least one peak in the corrugated surface of top sheet 108. In an embodiment, a tail can extend to cover a complete cycle of a corrugated first sheet, or more than a complete cycle as shown in FIG. 10, approximately covering from a local high, to a local low, to a second local high, and a second local low. Flashing strip 1006 can ensure that no rain or other moisture enters the panel 300, because flashing strip 1006 covers the inner exterior corner 1010, the ridge 1008 is engaged with the flashing channel 604, and flashing strip is resting on top sheet 108, thereby preventing rain from entering the panel. Flashing strip 1006 can be extruded from a clear plastic that can allow heat energy from the sun to pass through the flashing strip 1006 and the first sheet 108 to the conduit 102.

Figure 11:
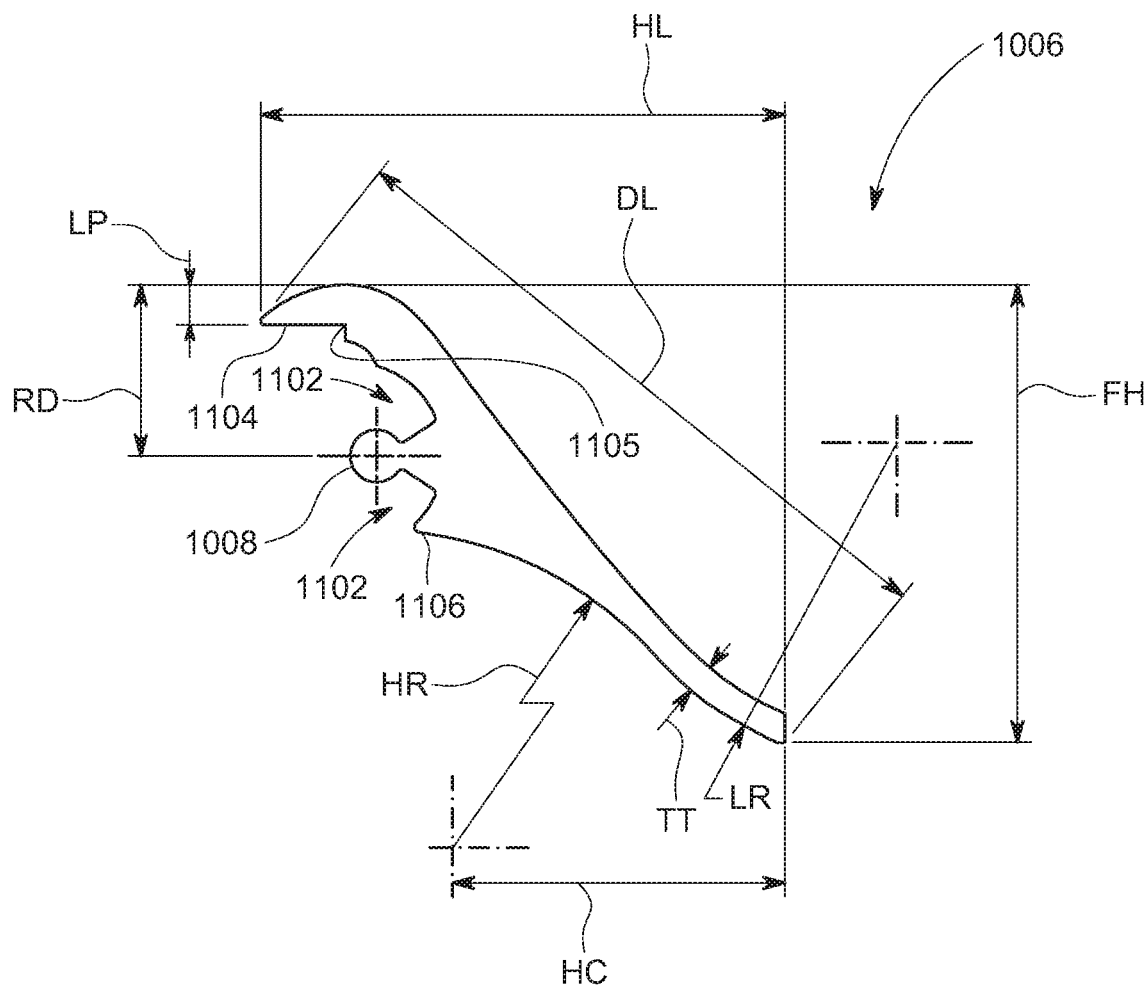
FIG. 11 is an end view of a flashing for a solar fluid heating panel with dimensions, according to an illustrative embodiment.

FIG. 11 is an end view of a flashing for a solar fluid heating panel with dimensions, according to an illustrative embodiment. Flashing strip 1006 can have a ridge 1008, and can have at least one indent 1102 defining the ridge 1008. Indent 1102 can be designed to accommodate a side of flashing channel 604, thereby providing a moisture seal and increasing the water sealing properties of flashing strip 1006. Flashing strip 1006 can have a channeled frame lip 1104 that can seal against the top of side frame member 306 to provide a moisture seal and thereby increase the water sealing properties of flashing strip 1006. Frame lip 1104 can lay over the top of side frame member 306. Frame lip 1104 can have a 90 degree channel 1105 adapted to accommodate and engage with the inner exterior corner of a panel. The 90 degree channel 1105 can help the frame lip 1104 to seal securely against the 90 degree corner of the side frame member. Frame lip 1104 and 90 degree channel 1105 can engage with the inner exterior corner along the length of the side frame member. Frame lip 1104 can also provide structural strength to the union of the flashing strip 1006 and side frame member 306, thereby preventing the flashing strip from lifting away from first sheet 108 under storm conditions. Flashing strip 1006 can also have a sheet lip 1106 that can seal against first sheet 108, thereby increasing the water sealing properties of flashing strip 1006. Flashing strip 1006 can have a tail 1012 that can contact first sheet 108. In an embodiment, a tail 1012 can extend as shown in FIG. 11 to cover approximately half of a corrugation cycle, from a union of the first sheet and the side frame member near a local high point of the first sheet to approximately near a local low point of the first sheet. The tail extending from above the top corner of the side frame member and covering the exterior sheet from approximately near a local high to approximately near a local low can prevent water from entering the panel, at least because the water is prevented from getting near the union of the exterior sheet and the side frame member. The frame lip 1104, the 90 degree channel 1105, the ridge 1108 locked into the c-channel 604, the indents 1102 sized and shaped to accommodate the sides of the c-channel, the sheet lip 1106, and/or the tail itself can contribute to preventing water from entering the panel and from a roof constructed from the panels from leaking water into the building below.

A flashing strip 1006 can have a flashing height FH from the top of the flashing strip to the bottom of the flashing strip of approximately 31 mm. A flashing strip 1006 can have a ridge depth RD from the top of the flashing strip to the center of the ridge of approximately 12 mm. A sheet lip 1106 can have a curved upper surface, and can have a maximum lip thickness LP of approximately 2.8 mm. A flashing strip 1006 can have a horizontal length HL of approximately 36 mm. A flashing strip 1006 can have a diagonal length DL of approximately 46 mm. A flashing strip 1006 can be designed to engage with a first sheet 108 having a corrugation cycle length of approximately 58 mm, and flashing strip 1006 can have a half-cycle length HC from a local high to a local low of approximately 29 mm. A flashing strip can have a high radius HR where the tail follows along a local high of a first sheet, and high radius HR can be approximately 27 mm. A flashing strip can have a low radius LR where the tail follows along a local low of a first sheet, and low radius LR can be approximately 22 mm. A flashing strip 1006 can have a flashing length FL from the end of sheet lip 1106 to a first local low of approximately 46 mm. A flashing strip can have a tail thickness TT of approximately 2 mm, however the thickness can be highly variable.

Figure 12A:
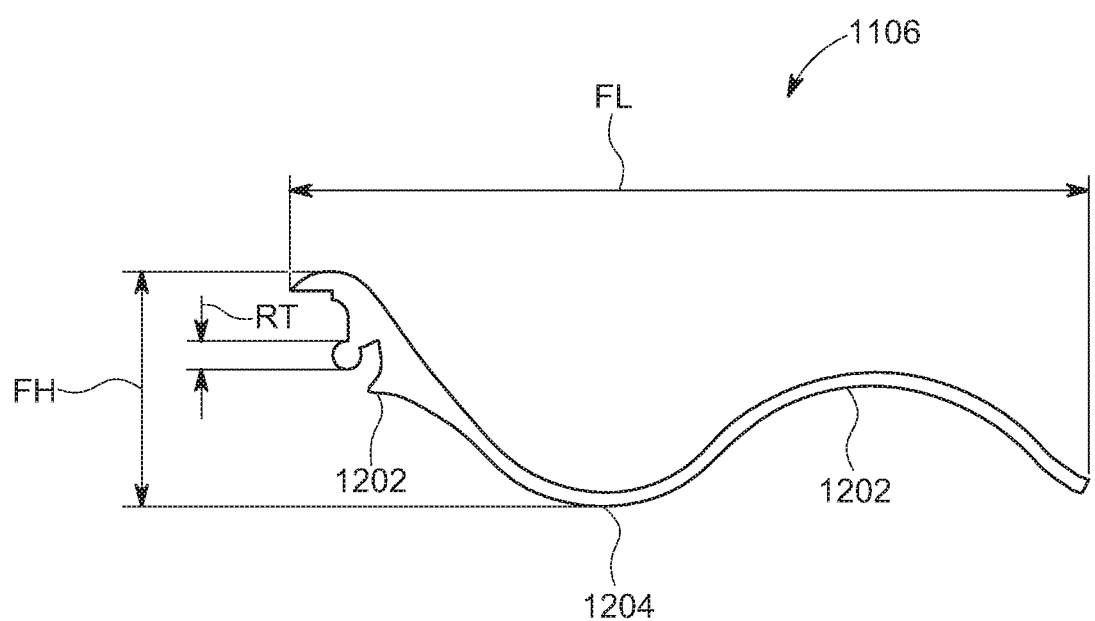
FIG. 12A is an end view of a flashing for a solar fluid heating panel with additional dimensions, according to illustrative embodiment.

FIG. 12A is an end view of a flashing for a solar fluid heating panel with additional dimensions, according to illustrative embodiment. A flashing strip 1006 can have a tail 1012 with high point 1202 and a low point 1204. High point 1202 can engage with a local high of a first sheet, and low point 1204 can engage with a local low of a first sheet. Flashing strip 1006 can have a ridge thickness RT of approximately 4 mm, however, it should be clear that the ridge thickness should be adapted to engage with flashing channel 604, and can be highly variable depending on the dimensions of flashing channel 604. A flashing strip 1006 can have a flashing height FH from the top of the flashing strip to the bottom of the flashing strip of approximately 33 mm. A flashing strip 1006 can have a flashing length FL from the end of sheet lip 1106 to the end of the tail of approximately 110 mm. It should be clear that two flashing strips 1006 can be extruded from the same extruder die and can be used on both sides of the panel 300, because the second flashing strip 1006 can be turned around and inserted into the second side of the panel.

Figure 12B:
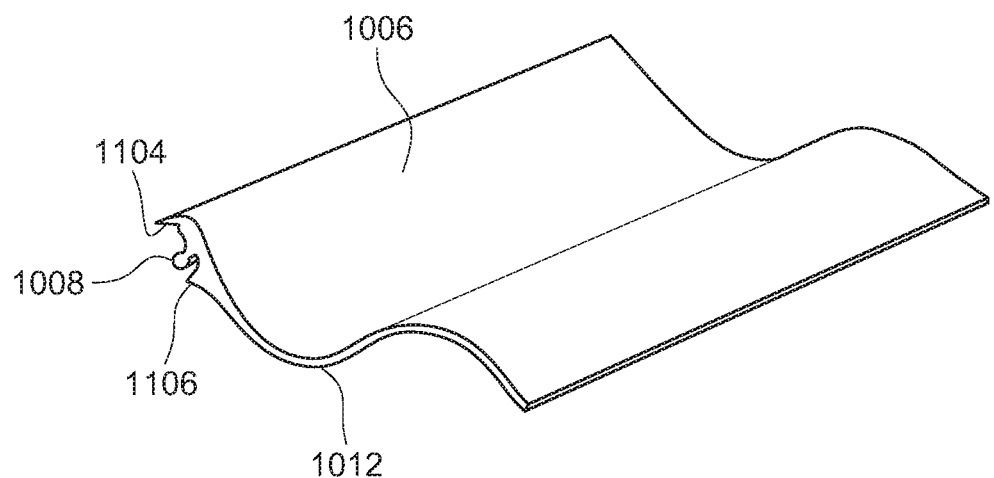
FIG. 12B is a perspective view of a flashing for a solar fluid heating panel, according to the illustrative embodiment.

FIG. 12B is a perspective view of a flashing for a solar fluid heating panel of FIG. 12A, according to the illustrative embodiment. Flashing strip 1006 can have a frame lip 1104, a ridge 1008, a sheet lip 1106, and a tail 1012. The length of flashing strip 1006 can be the same as the length of a side frame member 306, and flashing strip 1006 can be engaged with the side frame member 306 along the length of the panel 300.

Figure 12C:
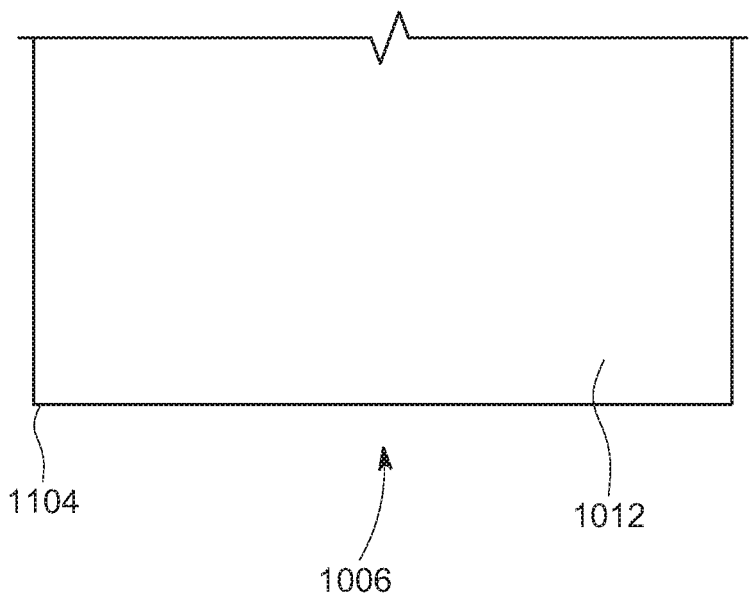
FIG. 12C is a top view of the flashing for a solar fluid heating panel of FIG. 12A, according to the illustrative embodiment.
Figure 12D:
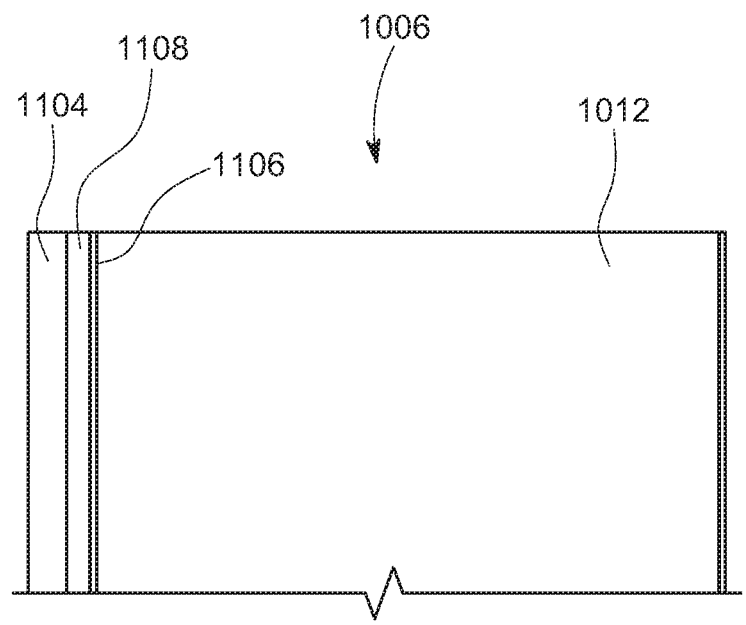
FIG. 12D is a bottom view of the flashing for a solar fluid heating panel of FIG. 12A, according to the illustrative embodiment.
Figure 12E:
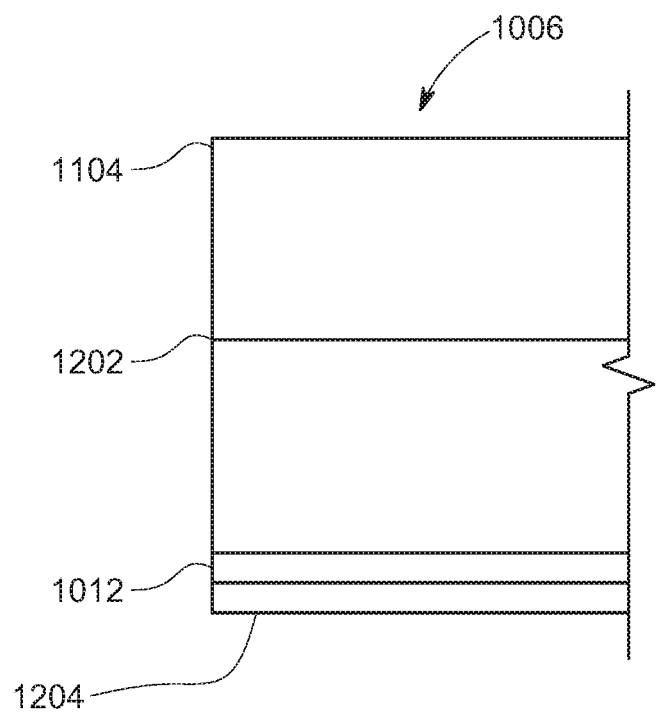
FIG. 12E is a side view from an outer side of the flashing for a solar fluid heating panel of FIG. 12A, according to the illustrative embodiment.
Figure 12F:
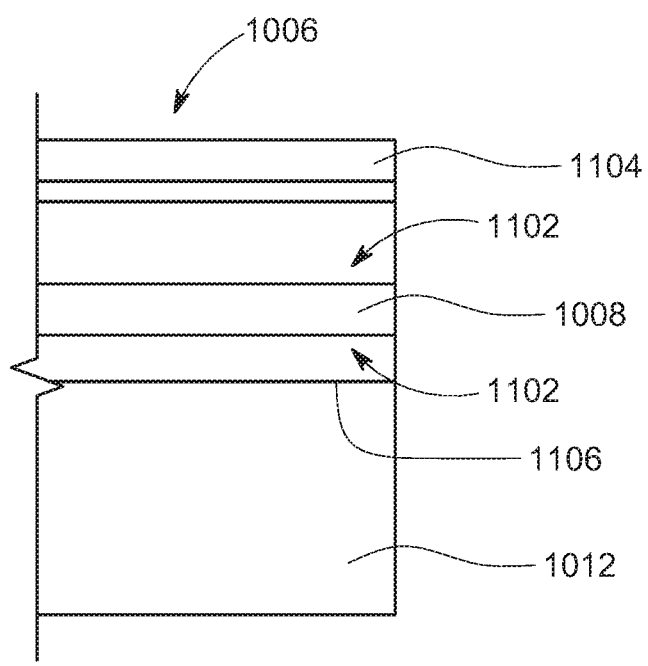
FIG. 12F is a side view from an inner side of the flashing for a solar fluid heating panel of FIG. 12A, according to the illustrative embodiment.
Figure 12G:
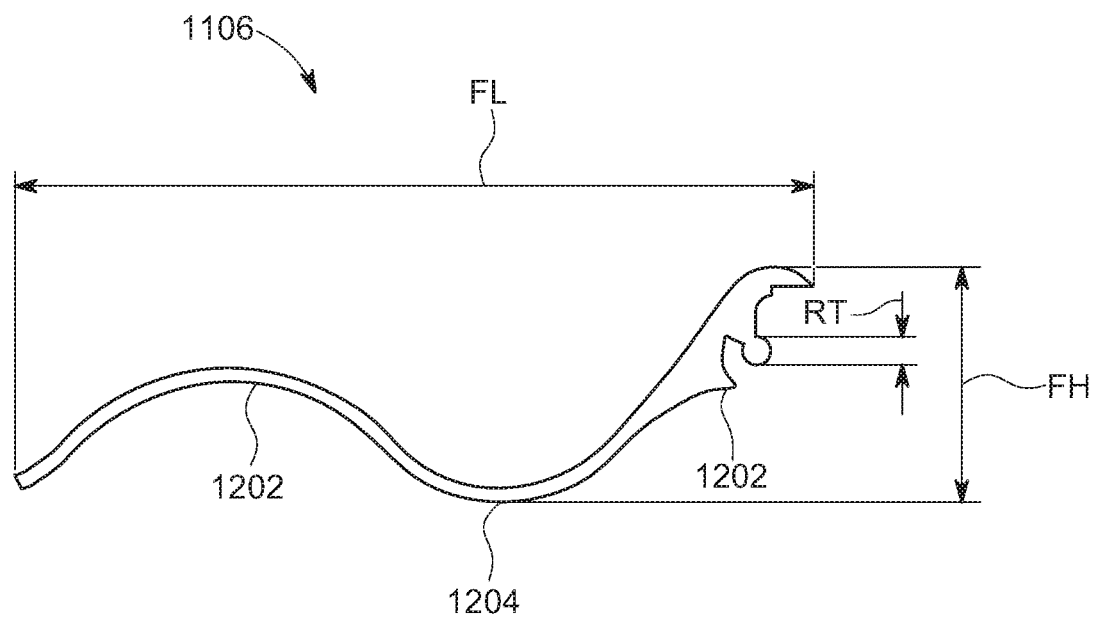
FIG. 12G is an end view of the flashing for a solar fluid heating panel of FIG. 12A from a second end, according to the illustrative embodiment.

FIG. 12C is a top view of the flashing for a solar fluid heating panel, FIG. 12D is a bottom view of the flashing for a solar fluid heating panel, FIG. 12E is a side view from an inner side of the flashing for a solar fluid heating panel, FIG. 12F is a side view from an outer side of the flashing for a solar fluid heating panel of FIG. 12A, and FIG. 12G is an end view from a second end of the flashing for a solar fluid heating panel, according to the illustrative embodiment. Flashing strip 1006 can have a tail 1012, at least one indent 1102, a frame lip 1104, a sheet lip 1106, a ridge 1108, a high point 1202, and a low point 1204.

Figure 13A:
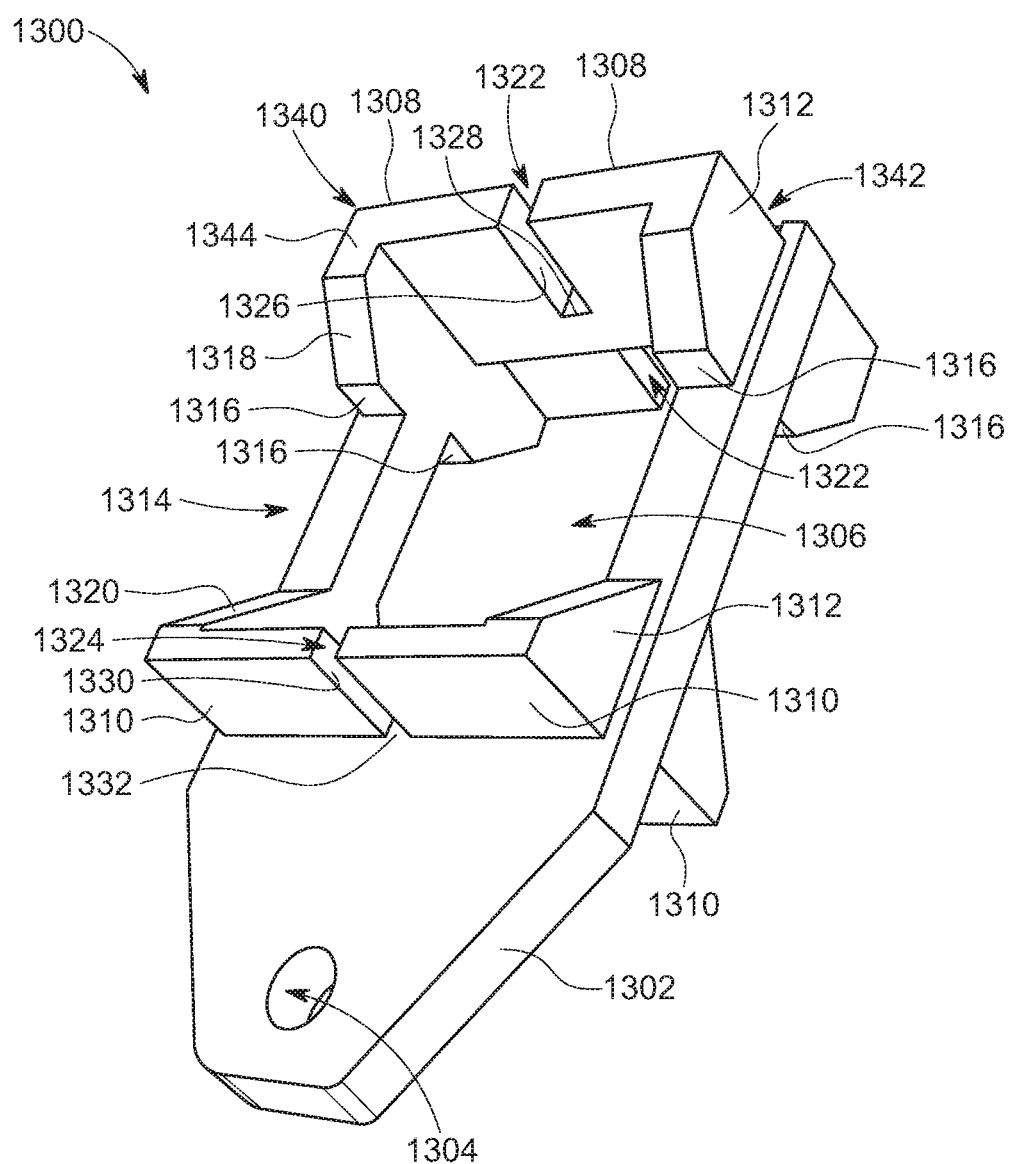
FIG. 13A is a perspective view of a mounting bracket for installation of one or more solar fluid heating panels, according to an illustrative embodiment.
Figure 13D:
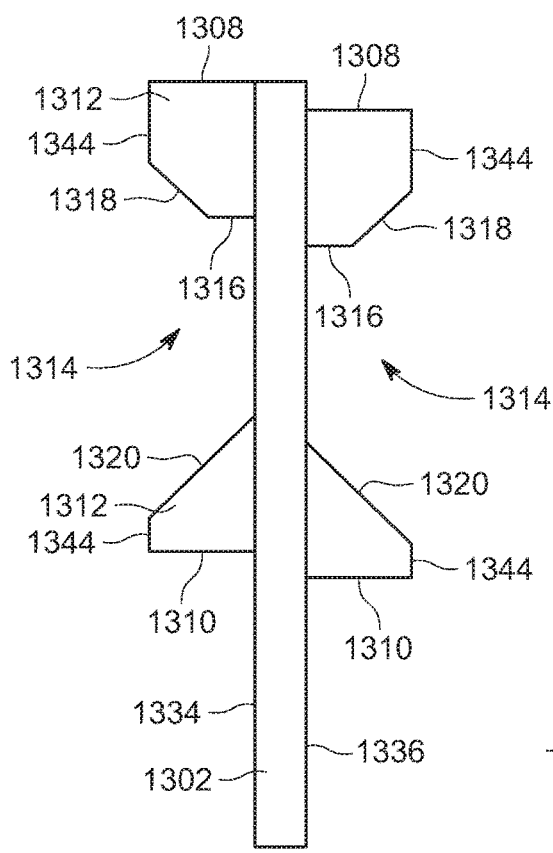
FIG. 13D is a first side view of the mounting bracket for installation of one or more solar fluid heating panels of FIG. 13A, according to an illustrative embodiment.
Figure 13E:
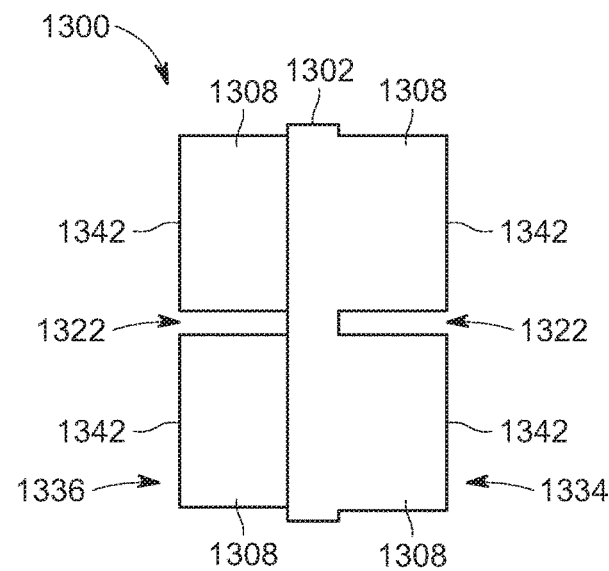
FIG. 13E is a top view of the mounting bracket for installation of one or more solar fluid heating panels of FIG. 13A, according to an illustrative embodiment.
Figure 13F:
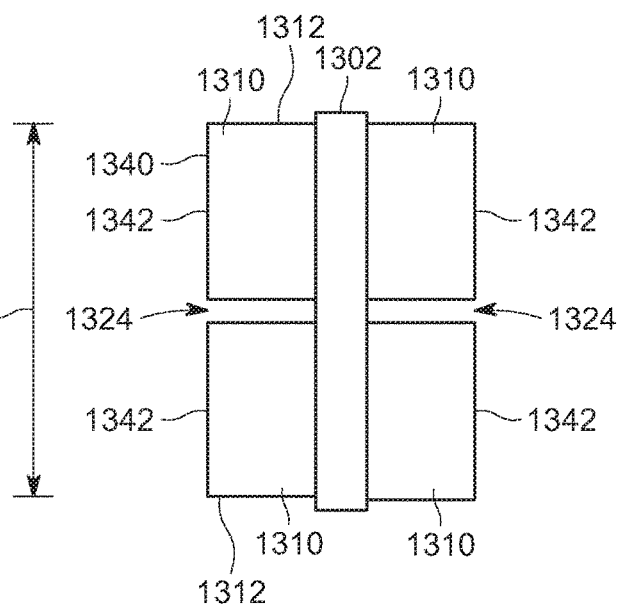
FIG. 13F is a bottom view of the mounting bracket for installation of one or more solar fluid heating panels of FIG. 13A, according to an illustrative embodiment.
Figure 13G:
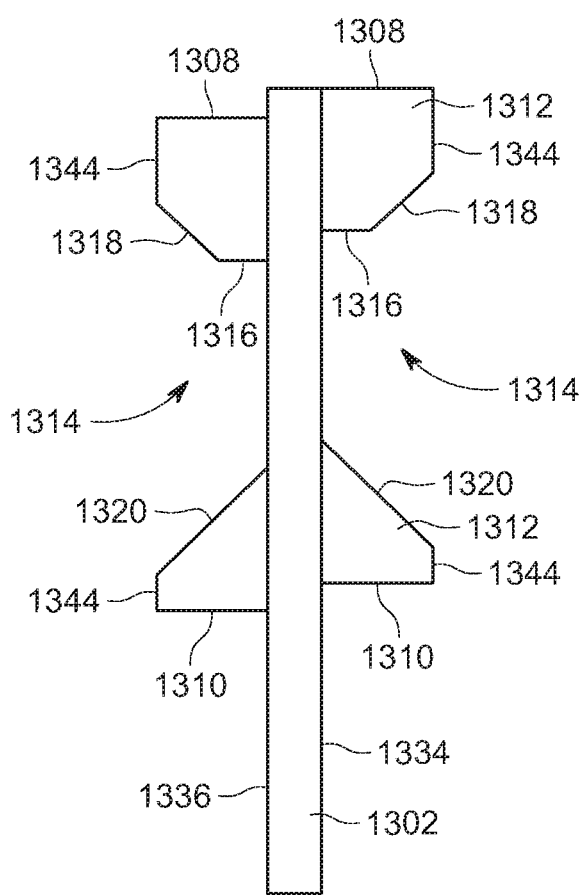
FIG. 13G is a second side view of the mounting bracket for installation of one or more solar fluid heating panels of FIG. 13A, according to an illustrative embodiment.

FIG. 13A is a perspective view of a mounting bracket for installation of one or more solar fluid heating panels, according to an illustrative embodiment. A mounting bracket 1300 can be a molded or cast single object that can allow for easy installation of multiple pre-constructed panels, and can allow for easy connection of an inlet port to a neighboring outlet port. One mounting bracket 1300 can be engaged with a single corner of each or four panels, and one panel 300 can be engaged with four mounting brackets 1300 at each corner, explained more fully below. A mounting bracket 1300 can have a plate 1302, and bolt hole 1304 that can be used to bolt the mounting bracket to a purlin of a roof. A plate can include a lower portion, referred to as a stanchion, that includes the bolt hole and can be attached to a purlin by a bolt through the bolt hole, and the plate can include an upper portion, referred to as a brace, that can support the panels. A mounting bracket 1300 can have a central opening 1306 that can allow a tool to be inserted through the central opening to connect the inlet port of one panel to the outlet port of a neighboring panel. A mounting bracket can have two upper shelves 1308 on each side, and two lower feet 1310 on each side.

FIGS. 13B, 13C, 13D, 13E, 13F, 13G are a front view, a rear view, a first side view, a top view, a bottom view, and a second side view, respectively, of the mounting bracket for installation of one or more solar fluid heating panels of FIG. 13A, according to an illustrative embodiment. A mounting bracket 1300 can have a plate 1302, a bolt hole 1304, a central opening 1306, two upper shelves on each side, and two lower feet on each side.

Figure 14A:
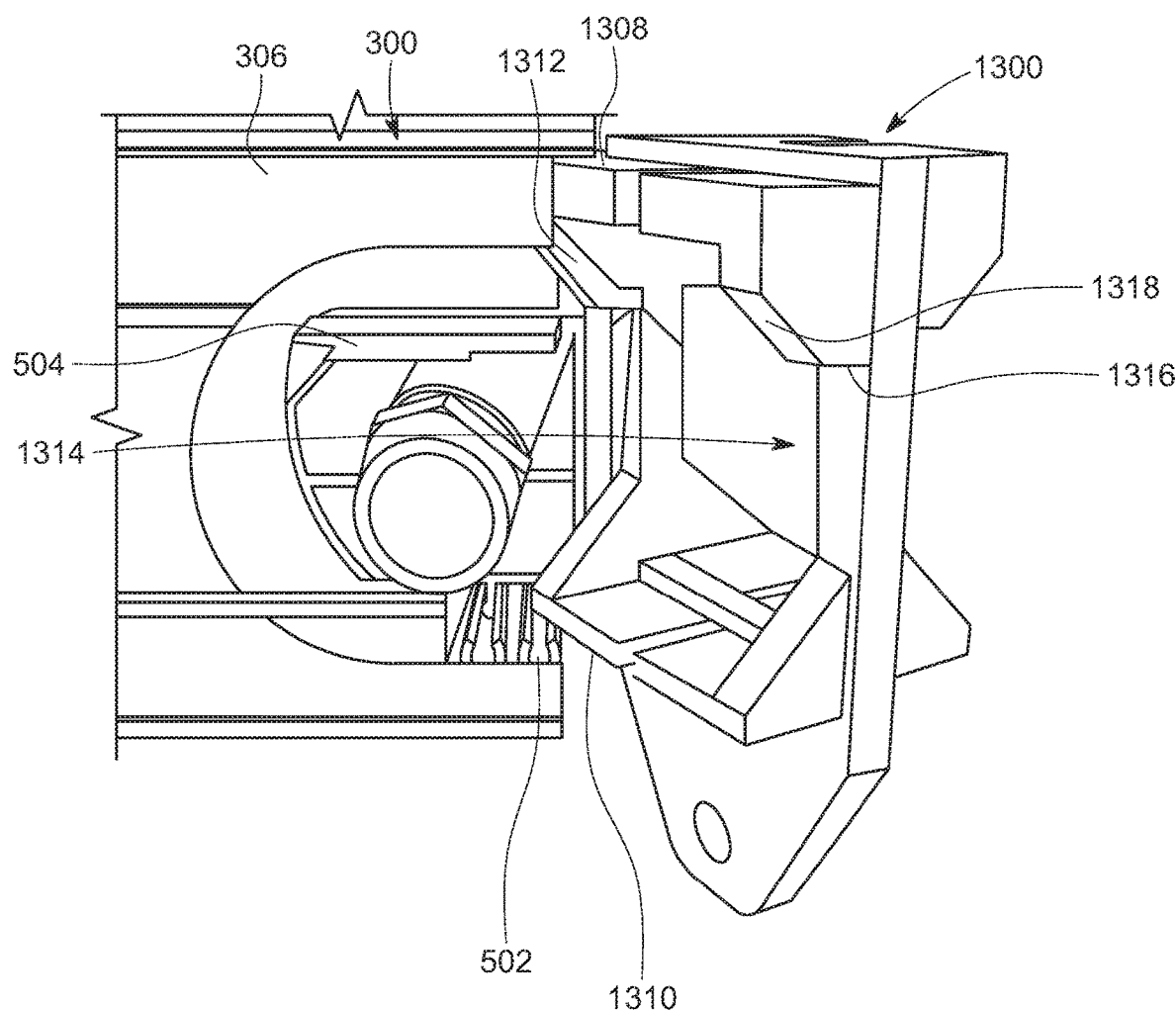
FIG. 14A is a perspective view of an upper corner of a solar fluid heating panel partially engaged with a mounting bracket, according to an illustrative embodiment.

FIG. 14A is a perspective view of an upper corner of a solar fluid heating panel partially engaged with a mounting bracket, according to an illustrative embodiment. Turning to FIGS. 13A-13G and 14A, an upper shelf 1308 can be inserted into a side frame member 306 and can support side frame member. Upper shelf 1308 can support the weight of at least ¼ of a panel, and holds the corner of a panel in location when the panel is installed. Lower foot 1310 can rest on interior tab 502, or another interior surface of the panel such as the bottom of side frame member 306. Lower foot 1310 can prevent the panel from lifting up away from the installation location in the event of strong winds. The upper shelves 1308 and lower feet 1310 at each corner can secure the panel against hurricane winds. Mounting bracket 1300 can also have sidewalls 1312, and the inner wall of the side frame member 306 can be against sidewall 1312 when the panel 300 is fully engaged with the mounting bracket 1300. Side wall 1312 can have a side cutout 1314, and side cutout 1314 can have a ceiling 1316, a guide face 1318. Ceiling 1316 can rest on exterior tab 504, and ceiling 1316 can also help to hold the panel down in the event of strong winds. Mounting bracket 1300 can have guide faces 1318 that can make it easier to guide the side frame member 306 onto the mounting bracket 1300, while also allowing the top of the shelf 1308 and the bottom of the ceiling 1316 to both be engaged with the panel frame when the panel frame is in place.

Figure 14B:
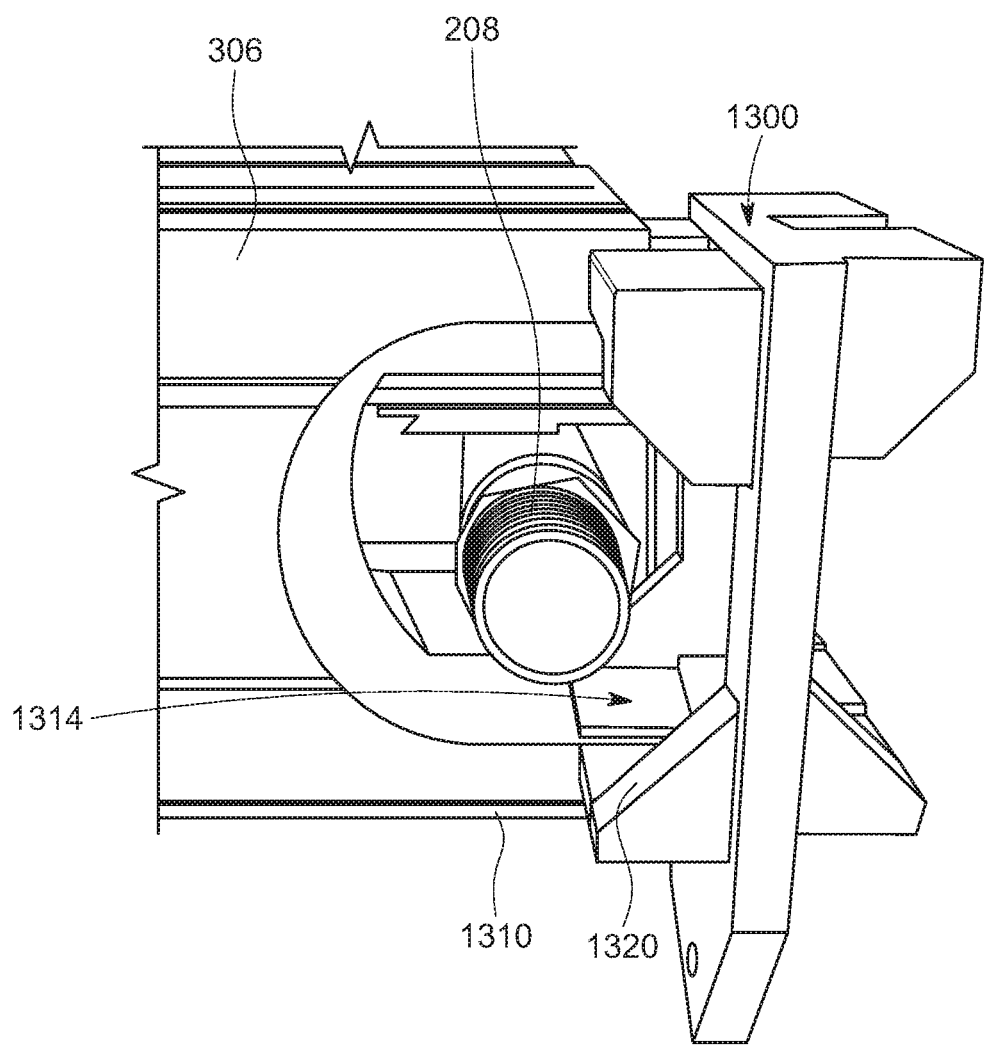
FIG. 14B is a perspective view of the upper corner of a solar fluid heating panel increasingly engaged with a mounting bracket, according to an illustrative embodiment.

FIG. 14B is a perspective view of the upper corner of a solar fluid heating panel increasingly engaged with a mounting bracket, according to an illustrative embodiment. Turning to FIGS. 13A-13G and 14B, mounting bracket 1300 can have a side cutout 1314 with a lower ramp 1320. Side cutout 1314 allows the inlet stem 208 or outlet stem to extend through the side cutout 1314 and meet the inlet stem or outlet stem of the neighboring panel. Lower ramp 1320 is at an angle that allows the lower foot 1310 to slide under the inlet stem or outlet stem while also providing structural strength to the lower foot 1310.

Figure 14C:
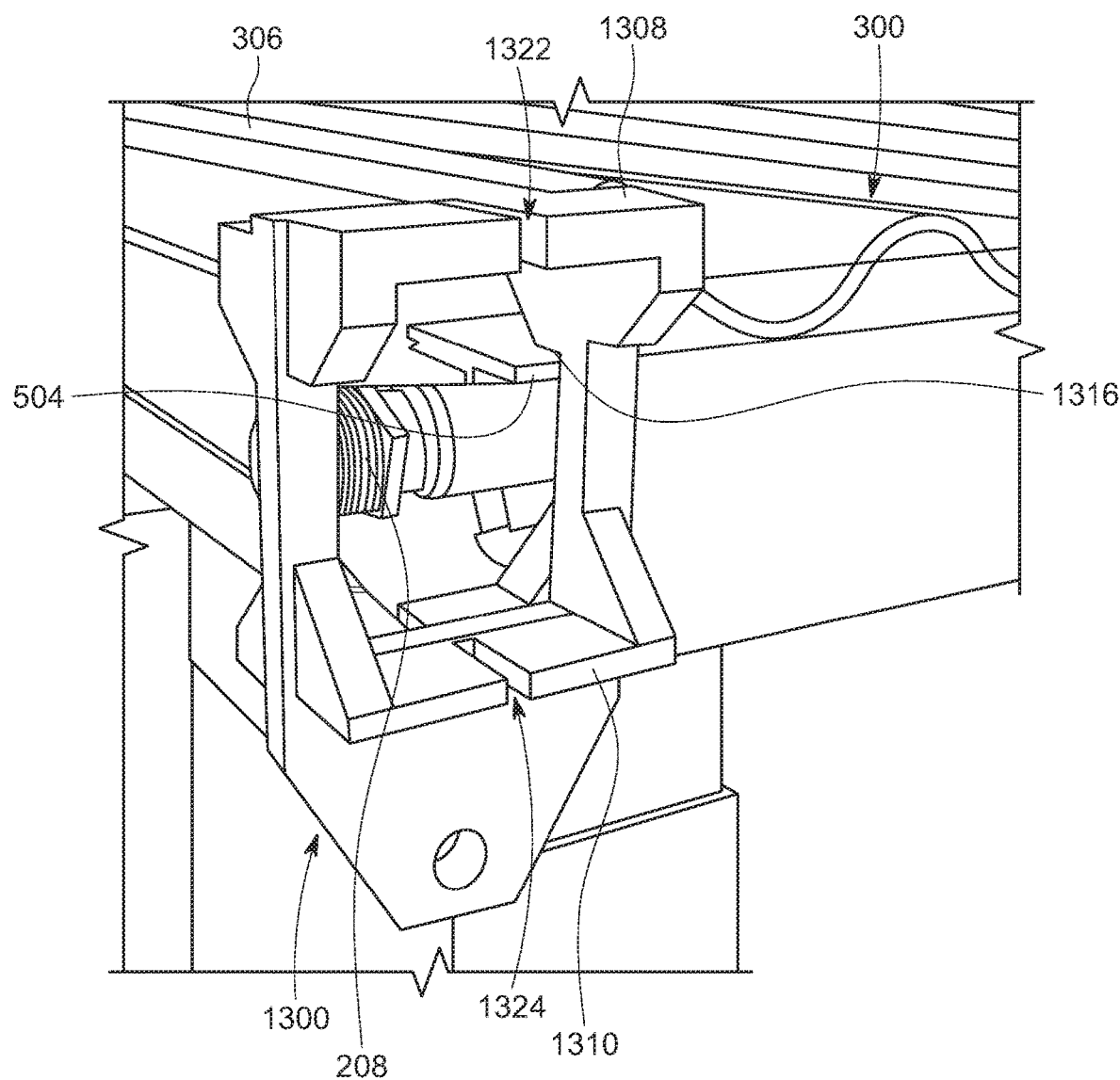
FIG. 14C is a perspective view of an upper corner of a solar fluid heating panel fully engaged with a mounting bracket and showing access to a conduit connector, according to an illustrative embodiment.

FIG. 14C is a perspective view of an upper corner of a solar fluid heating panel fully engaged with a mounting bracket and showing access to a conduit connector, according to an illustrative embodiment. Turning to FIGS. 13A-13G and 14C, ceiling 1316 is above exterior tab 504, and the inlet stem 208 can protrude from under the exterior tab 504. A tool can be inserted through opening 1306 to attach an inlet stem of one panel to a neighboring outlet stem. The upper shelves 1308 can have a shelf gap 1322 between two upper shelves 1308, such that shelf gap 1322 divides them into two upper shelves. The two upper shelves 1308 can be inserted into two neighboring panels. Similarly, the two lower feet 1310 on one side of the mounting bracket can have a foot gap 1324 between the two lower feet, and the two lower feet 1320 can be inserted in to the two neighboring panels.

Turning back to FIGS. 13A-13F, a mounting bracket can have a rear face 1334 and a front face 1336. The upper shelves 1308, lower feet 1310, and sidewalls 1312 on one face of the plate 1302 can form a mounting block 1340. A mounting bracket 1300 can have a mounting block 1340 on each face of the plate 1302. A mounting block 1340 have a mounting block width MW measured from sidewall 1312 to sidewall 1312. The mounting block width MW can be sized to fit within the combined inner width of two interlocked side frames and support the interlocked side frames, discussed more fully below. A shelf gap 1322 and a foot gap 1324 can divide a mounting block 1340 into two mounting units 1342. A mounting bracket 1300 can have four mounting units 1342, with two mounting units 1342 on either face of the mounting bracket 1300. A mounting unit 1342 can have a leading facet 1344 that can be the portion of the mounting unit 1342 farthest from the plate. Leading facet 1344 can be the portion of the shelf 1308 and/or foot 1310 that enters the opening of the panel first. A single mounting unit 1342 can be inserted into an opening in one panel, such as the opening at the end of a side frame member 306. The four mounting units 1342 on a mounting bracket can each support a corner of a different panel 300, such that a single mounting bracket can support four panels. A mounting unit 1342 can be in contact with the interior of the opening on four sides. The top of the shelf 1308, the bottom of the foot 1310, the side of the side wall 1312, the side of the shelf defining the shelf gap 1322, and the side of the foot defining the foot gap 1324 can be in contact with the interior of the panel. The contact on all four sides of the mounting unit 1342 can secure the panel from moving in any of the four directions. Plate 1302 can contact the exterior of the panel 300 and can thereby prevent the panel from moving in a fifth direction. A second mounting bracket 1300 installed at the opposite end of a panel, in the same manner as described above, can prevent the panel from moving in the sixth direction, effectively securing the panel in place and preventing movement in any direction. A single mounting bracket 1300 can have four mounting units 1342 that can support the corners of four different panels, and a single panel can be supported by a mounting units 1342 on each of four different mounting brackets located at the four corners of the panel.

Figure 15A:
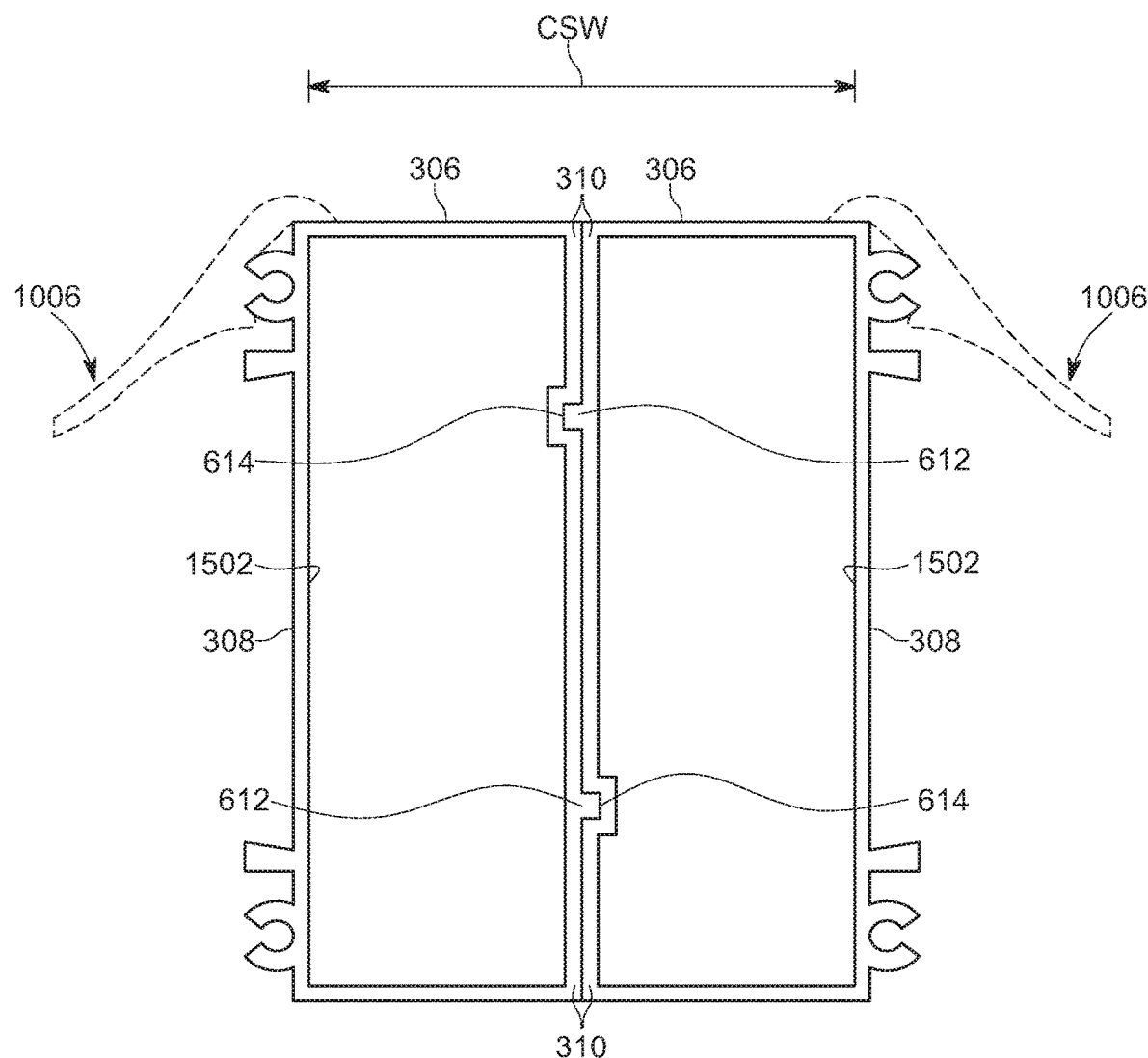
FIG. 15A is an end view of the side frame members of two neighboring panels, according to an illustrative embodiment.

FIG. 15A is an end view of the side frame members of two neighboring panels, according to an embodiment. Two neighboring panels can be mounted side by side, and the tongue 612 of one side frame member 306 can be engaged with the groove 614 of a neighboring side frame member. The side frame members 306 can both be extruded from the same extrusion die, and flashing strips 1006 can both be extruded from the same extrusion die, and the parts can be oriented appropriately for their location on the panel. Turning now to FIGS. 13 and 15, shelf gap 1322 and foot gap 1324 can accommodate the outer walls 310 of two neighboring panels. Shelf gap 1310 can have gap sides 1326 that can be the sides of the upper shelves, and a gap base 1328 at the back of the gap 1310 at plate 1302. The gap sides 1326 can hold the two outer walls 310 together so that the tongues 612 and grooves 614 can be held in engagement with each other, thereby increasing the rain resistance of a union between two neighboring panels. Similarly, foot gap 1324 can have lower gap sides 1330 that can be the sides of the lower feet 1310, and a gap base 1332 at the back of the gap 1324 at plate 1302. Lower gap sides 1330 can also hold the two outer walls 310 together so that the tongues 612 and grooves 614 can be held in engagement with each other, thereby increasing the rain resistance of a union between two neighboring panels. The side frames can have an interior inner surface 1502 on the inside of the inner surface 308. Two neighboring side frames 306, 306 that are interlocked as shown in FIG. 15A with the tongues 612 and grooves 614 held in engagement with each other can have a combined inner width CSW measured from one interior inner surface 1502 to the other interior inner surface 1502. The combined inner width CSW can be sized to accommodate the mounting block width MW and be supported by the mounting block.

Figure 15B:
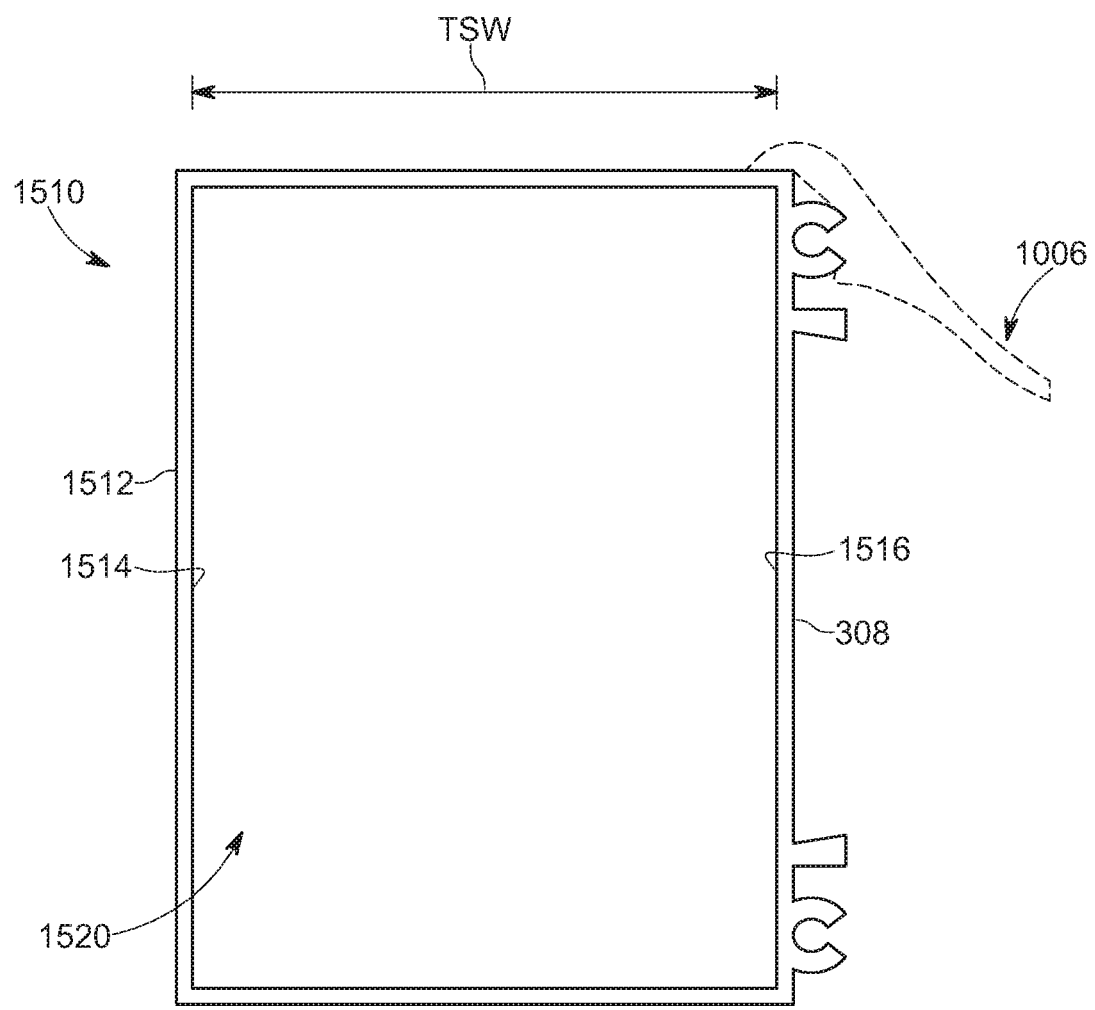
FIG. 15B is an end view of a terminal side frame member for use at the far left edge or far right edge of an installation of panels, according to an illustrative embodiment.

FIG. 15B is an end view of a terminal side frame member for use at the far left edge or far right edge of an installation of panels, according to an illustrative embodiment. Terminal side frame member 1510 can have an inner surface 308 that can be partially cut away at both ends of the terminal side frame member 1510 to allow the terminal side frame member 1510 to be engaged with an upper frame member and a lower frame member. Terminal side frame member 1510 can have a finishing surface 1512 that can be the far left or far right edge of an array of multiple panels. The terminal side frame member 1510 can have interior inner surfaces 1514, 1516, and the terminal side frame member 1510 can have an inner width TSW measured between the interior inner surfaces 1514, 1516 that can be approximately the same width as the combined inner width CSW of two neighboring interlocked side frames. The terminal side frame member 1510 can have an internal vessel 1520 that can carry water connections into or out of the panel array.

Figure 16A:
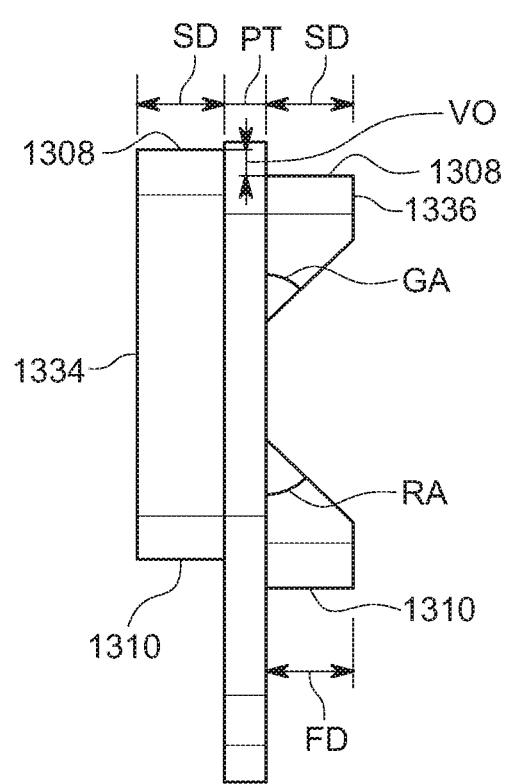
FIG. 16*a* is a side view of a mounting bracket showing dimensions, according to an illustrative embodiment.

FIG. 16a is a side view of a mounting bracket showing dimensions, according to an illustrative embodiment. A mounting bracket 1300 can have a rear face 1334 and a front face 1336. In various embodiments, a mounting bracket 1300 can be free of cutouts on the rear face, while still having cutouts on the front face to allow connection between the inlet and outlet on neighboring panels. Mounting bracket 1300 can be secured to a roof purlin with the rear face 1334 facing towards the roof peak. Rear face 1334 can support the lower corners of two adjacent panels 300, and front face 1336 can support the upper corners of two adjacent panels 300. The panels 300 can be modular, and many copies of the same panels can be installed together to form a roof. A downhill panel that can be farther from the roof peak can be supported by an upper shelf 1308 on the front face 1336, and an uphill panel that can be closer to the roof peak can be supported by an upper shelf 1308 on the rear face 1334. A lower region of the uphill panel can rest against the plate 1302. In an embodiment, rear face 1334 can be free of side cutouts 1314, because the inlet ports 206 and outlet ports 210 can be at the upper end of a panel, so there may be no need for side cutouts 1316 around inlet/outlet stems on the rear face 1334 that supports the lower region of the panel. However, it should be clear that in various embodiments, the inlet ports 206 and outlet ports 210 could be at the lower end of a panel, and accordingly, the rear face 1334 can have side cutouts 1316 in various embodiments.

As shown in FIG. 16a, the upper shelf 1308 of the rear face 1334 can be slightly higher than the upper shelf 1308 of the front face 1336. The vertical offset VO between the top of an upper shelf 1308 on a rear face 1334 and the top of an upper shelf 1308 on a front face 1336 can be approximately 4 mm. The vertical offset VO can allow the overlap region 312 of the uphill panel to extend downwards over the plate 1302 and over the upper region of the downhill panel supported by the same mounting bracket 1300. The overlap region 312 can prevent rain or other moisture from seeping between the uphill panel and the downhill panel. The shelf depth SD of an upper shelf 1308 can be approximately 2 cm. The foot depth FD of a lower foot 1310 can be approximately 2 cm. A plate 1302 can have a plate thickness PT of approximately 1 cm. Guide faces 1314 can be at a guide angle GA of approximately 30 to 60 degrees, and preferably approximately 45 degrees. Lower ramps 1320 can be at a ramp angle RA of approximately 30-60 degrees, and preferably approximately 45 degrees.

Figure 16B:
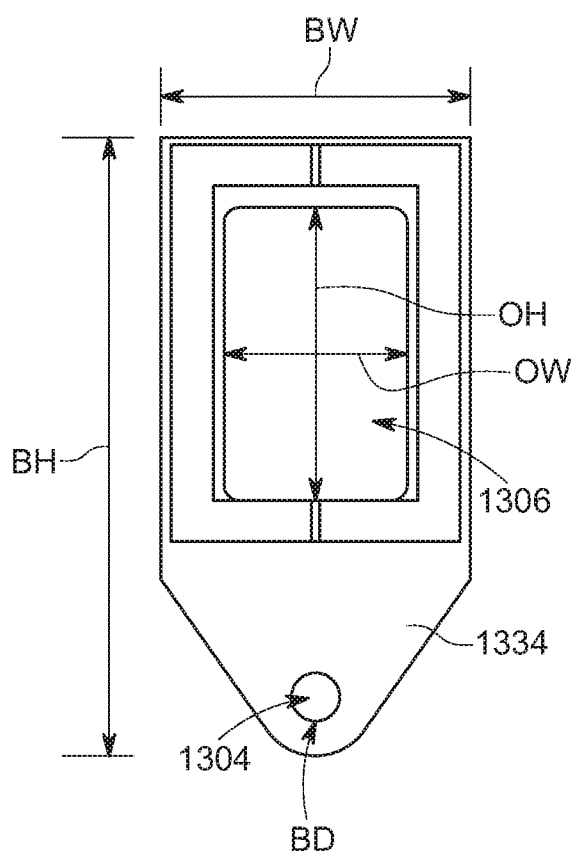
FIG. 16*b* is a rear view of a mounting bracket showing dimensions, according to an illustrative embodiment.

FIG. 16b is a rear view of a mounting bracket showing dimensions, according to an illustrative embodiment. Rear face 1334 can support the lower regions of two adjacent uphill panels. A mounting bracket 1300 can have a bracket width BW from one side of the bracket to the other of approximately 75 mm. A mounting bracket can have a bracket height BH from the top of the bracket to the bottom of the bracket of approximately 150 mm. A central opening 1306 can have an opening height OH from the bottom of the opening to the top of the opening of approximately 71 mm. A central opening 1306 can have an opening width OW from one side of the opening to the other side of the opening of approximately 47 mm. A bracket 1300 can have a bolt hole 1304 with a bolt hole diameter BD of approximately 12 mm.

Figure 16C:
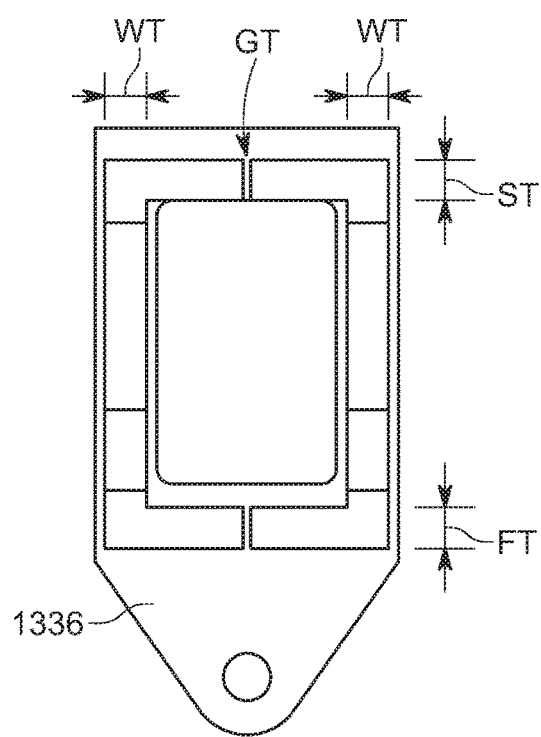
FIG. 16*c* is a front view of a mounting bracket showing dimensions, according to an illustrative embodiment.

FIG. 16c is a front view of a mounting bracket showing dimensions, according to an illustrative embodiment. Front face 1336 can support the upper regions of two adjacent downhill panels. The upper shelf 1308 can have a shelf thickness ST of approximately 8 mm. The lower foot 1310 can have a foot thickness FT of approximately 8 mm. The side walls 1312 can have a side wall thickness WT of approximately 8 mm. This upper shelf thickness ST, lower foot thickness FT, and side wall thickness WT can be the same for the rear face and the front face. The shelf gap 1322 and foot gap 1324 can have a gap thickness GT of approximately 2.5 mm, and this gap thickness GT can be the same for the rear face and the front face.

Figure 16D:
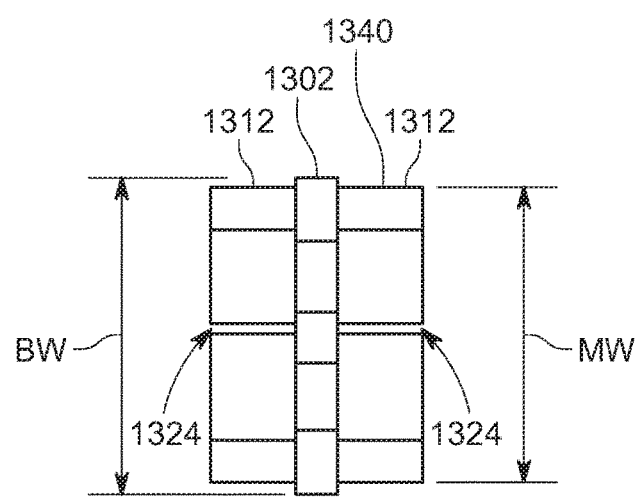
FIG. 16*d* is a bottom view of a mounting bracket showing dimensions, according to an illustrative embodiment.

FIG. 16d is a bottom view of a mounting bracket showing dimensions, according to an illustrative embodiment. The mounting block 1340 can have a mounting block width MW from the outside of one sidewall to the outside of the other sidewall of approximately 71 mm. The mounting bracket 1300 can have an overall bracket width BW of approximately 75 mm, so the sidewalls 1312 can be inset from the edge of the mounting bracket 1300 by approximately 2 mm on each side.

FIG. 17 is an end view of two partially-cut away neighboring panels supported by a mounting bracket, according to an illustrative embodiment. Two neighboring adjacent panels 300 can be supported by a single mounting bracket 1300. Central opening 1306 allows an installer to insert a tool through central opening 1306 to connect the inlet stem 208 of one panel to the outlet stem 212 of a neighboring panel. The gap sides of shelf gap 1322 and foot gap 1324 can hold the outer sides 310 of the two panels together with the tongues and grooves in engagement.

Figure 18:
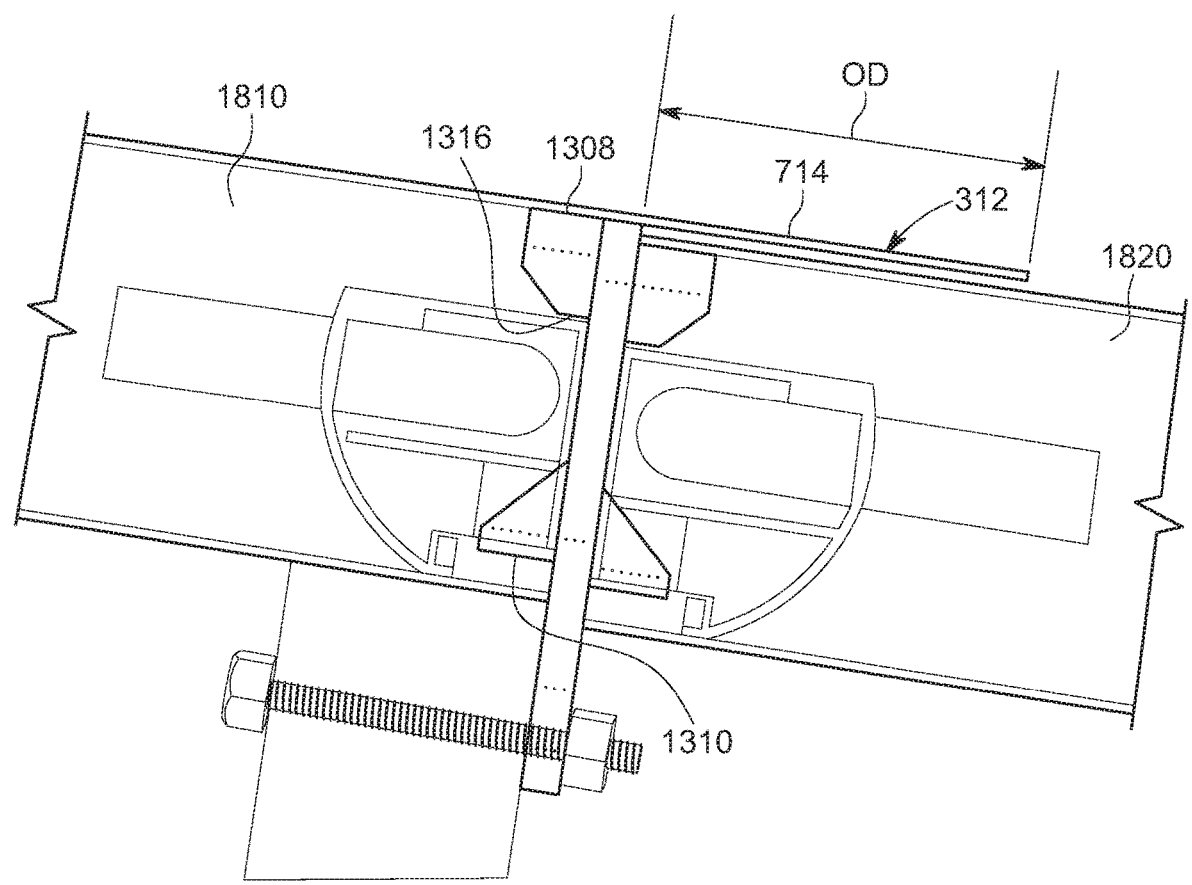
FIG. 18 is a side view of two partially cut-away panels supported by a mounting bracket, according to an illustrative embodiment.

FIG. 18 is a side view of two partially cut-away panels supported by a mounting bracket, according to an illustrative embodiment. Mounting bracket 1300 can be bolted to a purlin of a roof 1802 with a bolt 1804 through the bolt hole 1304. The upper shelves can 1308 support the weight of the panels 300, while ceiling 1316 and feet 1310 can hold the panels down to eliminate horizontal lift. The uphill panel 1810 is slightly higher than the downhill panel 1820 by a vertical offset distance VO. The uphill panel 1810 has overhang 714 and overlap region 312 that extend down over the mounting bracket 1300 and over the downhill panel 1820. The overlap region 312 allows the uphill panel to overlay the downhill panel much the same as one shingle overlays another shingle on a traditional roof. In an embodiment, the uphill panel can overlap the downhill panel by an overlap distance OD of approximately 10 cm, but it should be obvious that this overlap distance can be highly variable, and can be adjusted for local building code regulations, roof pitch, or other factors. The solar fluid heater and installation system described herein can be a replacement for a traditional roof. The panels can be pre-assembled and modular, such that a number of identical panels can be supported by mounting brackets to create a roof system. As noted above, second sheet 110 of the panel can reflect the majority of the sun's energy back at the conduit while still allowing most of the visible light to pass through. This means that an entire roof can be composed of panels that each allow most of the sun's ambient light to pass through into the building while blocking or reflecting the sun's UV and infra-red rays.

Figure 19A:
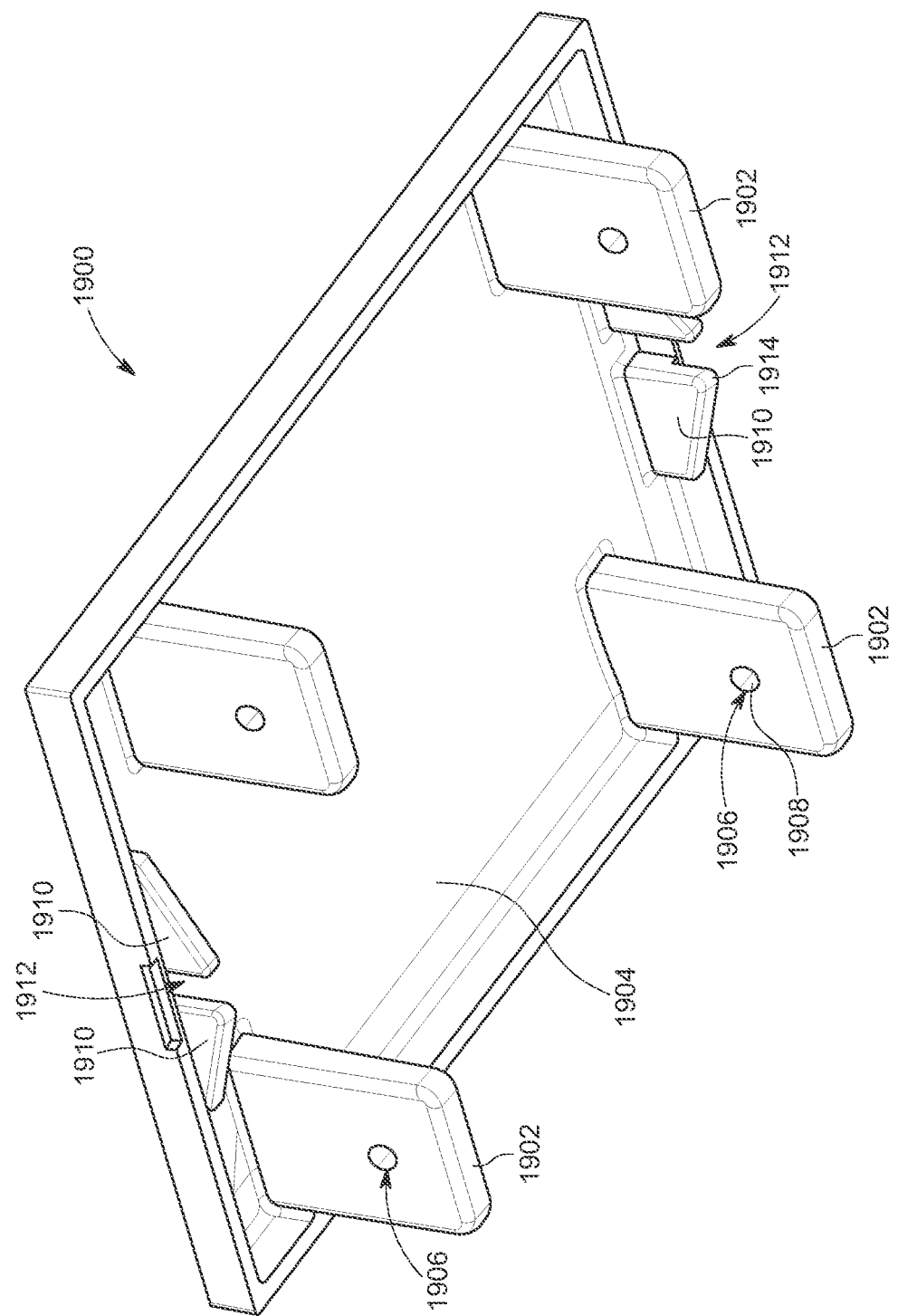
FIG. 19A is a rear perspective view of a finishing end cap, according to an illustrative embodiment.

FIG. 19A is a rear perspective view of a finishing end cap, according to an illustrative embodiment. A finishing end cap 1900 can be used to cap the ends of two interlocked side frames, as shown in FIG. 15A, or to cap a terminal side frame member 1510. The finishing end cap 1900 can have internal flanges 1902 extending from the internal side 1904 of the finishing end cap. The internal flanges 1902 can have screw holes 1906 that can include inlaid nuts 1908 within the screw holes. The internal flanges 1902 can extend into the side frame(s), and the screw holes 1906 can align with corresponding holes on the side frame(s), described more fully below.

The finishing end cap 1900 can also have one or more sets of two pinchers 1910 that can define a pinch gap 1912 between them. The pinchers 1910 can pinch together the two outer surfaces of two interlocked side frames, thereby holding the two side frames in the interlocked position shown in FIG. 15A. Pinchers 1910 can have sloped ends 1914 that can help to guide the two interlocked outer side surfaces into the pinch gap 1912. An installer who has installed a panel array as a roof can add the finishing end caps 1900 to the bottom edge of the terminal side frame members that are on the two side edges of the array, and the installer can add finishing end caps 1900 to each union of interlocked side frame members along the bottom edge of the panel array. The finishing end caps can improve the appearance of the array by hiding the inner conduits, and can also improve the function of the array by trapping heated air inside of the panels. In various embodiments such as a fence where panels are more likely to be touched by people, the end cap can have vent holes to allow heated air to escape, thereby cooling the frame and decreasing the likelihood of causing burns upon contact.

Figure 20A:
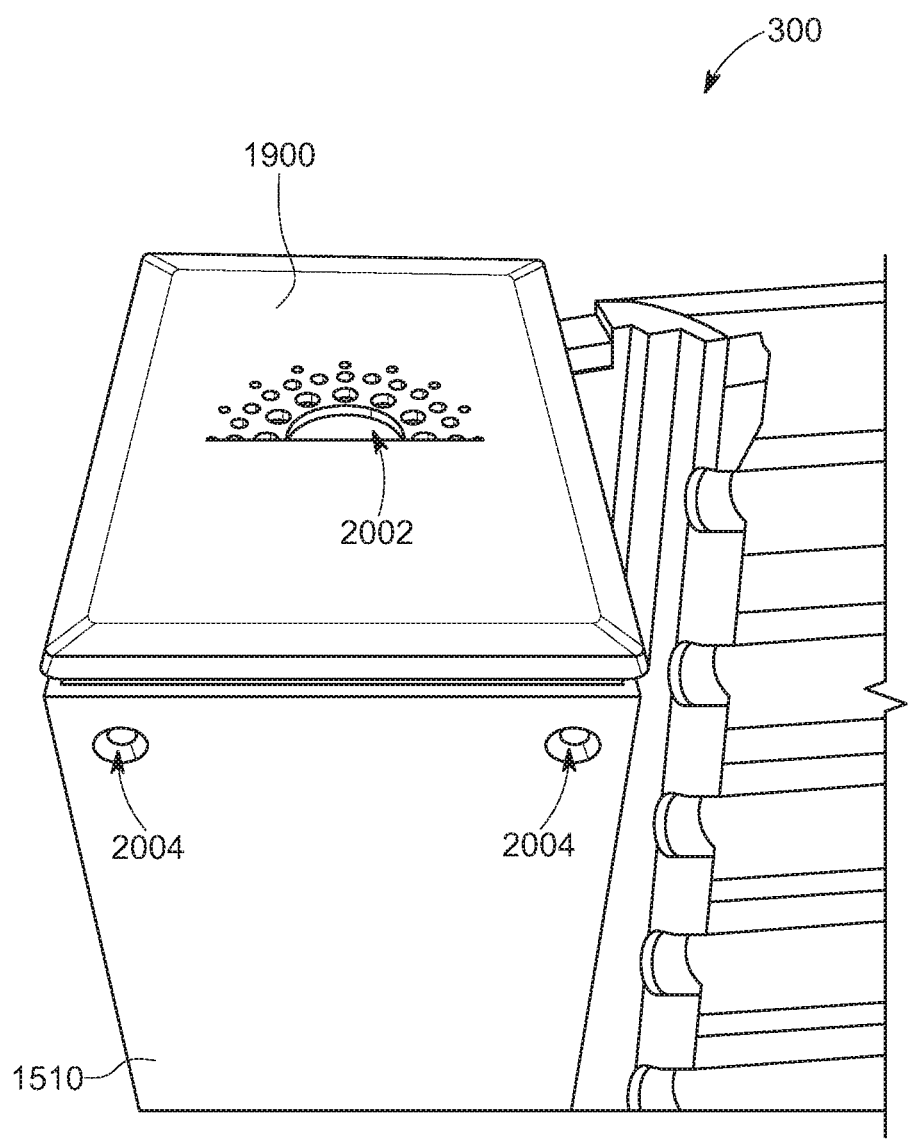
FIG. 20A is a perspective view of a finishing end cap on a terminal side frame member of a panel in a vertical orientation, according to an illustrative embodiment.

FIG. 20A is a perspective view of a finishing end cap on a terminal side frame member of a panel in a vertical orientation, according to an illustrative embodiment. Panels 300 can be arranged vertically, for example, as parts of fences or walls, and finishing end caps 1900 can be added along the top and/or bottom edges of the panel array. In various embodiments, the finishing end cap 1900 can have vents 2002 to allow heated air to escape in installations where burn prevention in a consideration. Various arrangements of vent holes on the finishing end cap 1900 are possible.

As shown in FIG. 20A, a terminal side frame member 1510 can have two screw holes 2004 on one side that can be aligned with the screw holes in two of the internal flanges of the end cap 1900, and can have two screw holes on the opposite side (not shown) of the terminal side frame member 1510 that can align with the screw holes in other internal flanges to secure the finishing end cap 1900 to the side frame member. Finishing end caps 1900 can also be used at the union of two interlocked side frame members, and each side frame member can have a screw hole on each side to align with the screw holes in the internal flanges. Screws can be screwed through the side frame(s) and into the screw holes 1906 to secure the finishing end cap 1900 in place at the end of the side frames, and finishing end cap 1900 can help to hold the interlocked side frame members together.

Figure 20B:
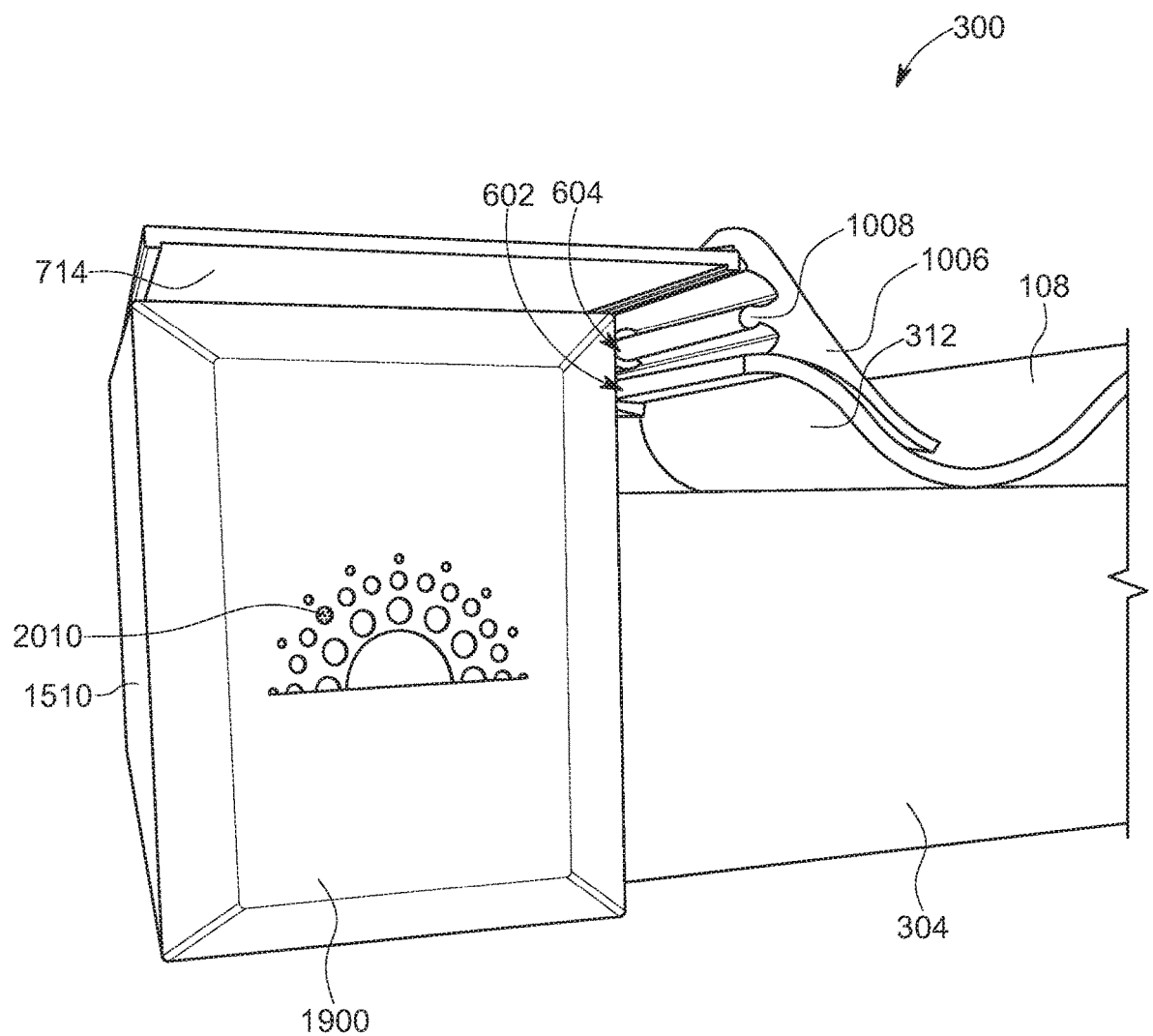
FIG. 20B is a perspective view of a finishing end cap on a terminal side frame member of a roof panel, according to an illustrative embodiment.

FIG. 20B is a perspective view of a finishing end cap on a terminal side frame member of a roof panel, according to an illustrative embodiment. Finishing end cap 1900 is shown in FIG. 20B at the bottom edge of a terminal side frame member 1510. In various embodiments, a finishing end cap 1900 can have a temperature mark 2010 that can be a colored dot. The temperature mark 2010, such as a red or blue dot, can indicate that one side of an array, such as a left terminal side frame member, has incoming cold water, and the other side of the array has outgoing heated water. Terminal side frame member 1510 can have an overhang 714, a sheet channel 602, and a flashing channel 604. The solar fluid heating panel 300 can include a lower frame member 304 that can engage with the terminal side frame member 1510. The panel 300 can have a first sheet 108 that can rest on the lower frame member 304, and the side of the first sheet 108 can be held by the terminal side frame member 1510.

The panel 300 can also have a flashing strip 1006 that can prevent rain from dripping into the panel. The flashing strip can rest on the overhang 714 and can rest on the first sheet 108. The flashing strip can have a shape that aligns with and meets the shape of the top sheet 108. The first sheet 108 can have a corrugated shape, and the flashing strip 1006 can have a corresponding curve. The flashing strip 1006 can be held by the terminal side frame member 1510. The flashing strip can have a ridge 1008 that can be held by the flashing channel 604. The flashing strip 1006 can be held in place by the flashing channel 604, and can be held in a fixed orientation through contact with the top of the terminal side frame and contact with the first sheet 108. The overhang 714, the top sheet 108, and the flashing strip 1006 can extend beyond the lower frame member 304 to form an overlap region 312.

In various embodiments that can be referred to as long-run embodiments, solar fluid heating panels can be various lengths, including, but not limited to, a panel length of approximately 4 meters or longer. In various long-run embodiments, solar fluid heating panels can be long enough to extend from the top of the roof to the bottom of the roof. In long-run embodiments with long panels that can extend from the top of the roof to the bottom of the roof, there may be no need for an uphill panel to overlap a downhill panel, and no need for overlap regions. In embodiments with panel lengths greater than 220 cm, mounting plates can be used to support the panels and to hold interlocked side frame members together along their lengths. FIG. 21A is a perspective view of a side frame member and a mounting plate, according to an illustrative embodiment. A side frame member 306 can have a mounting hole 2110 that is sized and shaped to accommodate a mounting plate 2120. The mounting plate 2120 can be inserted into the mounting hole 2110 in a first orientation, and can be twisted or rotated to a second orientation so that the mounting plate 2120 cannot be removed until it is returned to the first orientation. The mounting plate 2120 can have a stanchion 2122 with a bolt hole 1304, and a key 2124 that can be connected to the stanchion by a stalk 2126. A cleft 2128 can partially separate the stanchion 2122 and the key 2124. The mounting plate 2120 can have a table 2130 that can be a supporting surface for a second panel, explained more thoroughly below. The mounting hole 2110 can have a key slot 2112 that can accommodate the key 2124, and a pivoting area 2114 that can be large enough to allow the stalk 2126 to rotate within the pivoting area 2114 so that the mounting plate 2120 can be rotated into the second orientation.

Figure 21B:
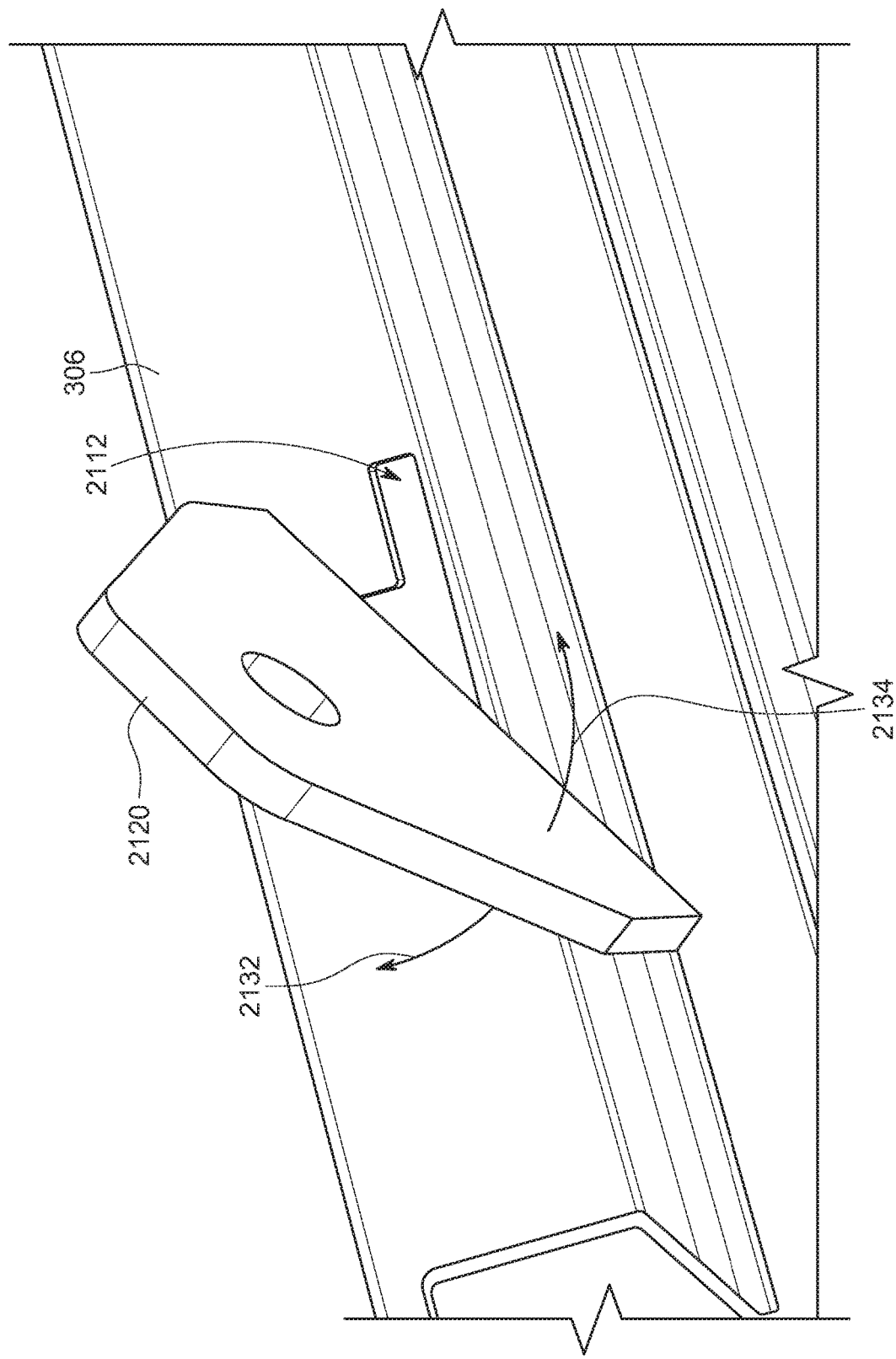
FIG. 21B is a perspective view of a mounting plate in a side frame member, according to an illustrative embodiment.

The key 2124 can be inserted into the key slot 2112 in the first orientation, and the mounting plate can be rotated into the second orientation so that a portion of the side frame member 306 is held within the cleft 2128. FIG. 21B is a perspective view of a mounting plate in a side frame member, according to an illustrative embodiment. Mounting plate 2120 is shown in an intermediate state between the first orientation and the second orientation. Rotation in the direction of arrow 2132 can rotate the mounting plate into the first orientation, so that the key can be removed through the key slot 2112, and rotation in the direction of arrow 2134 can rotate the mounting plate into the second orientation. In the second orientation, the mounting plate 2120 can hold a portion of the bottom of the side frame member 306 in the cleft.

Figure 21C:
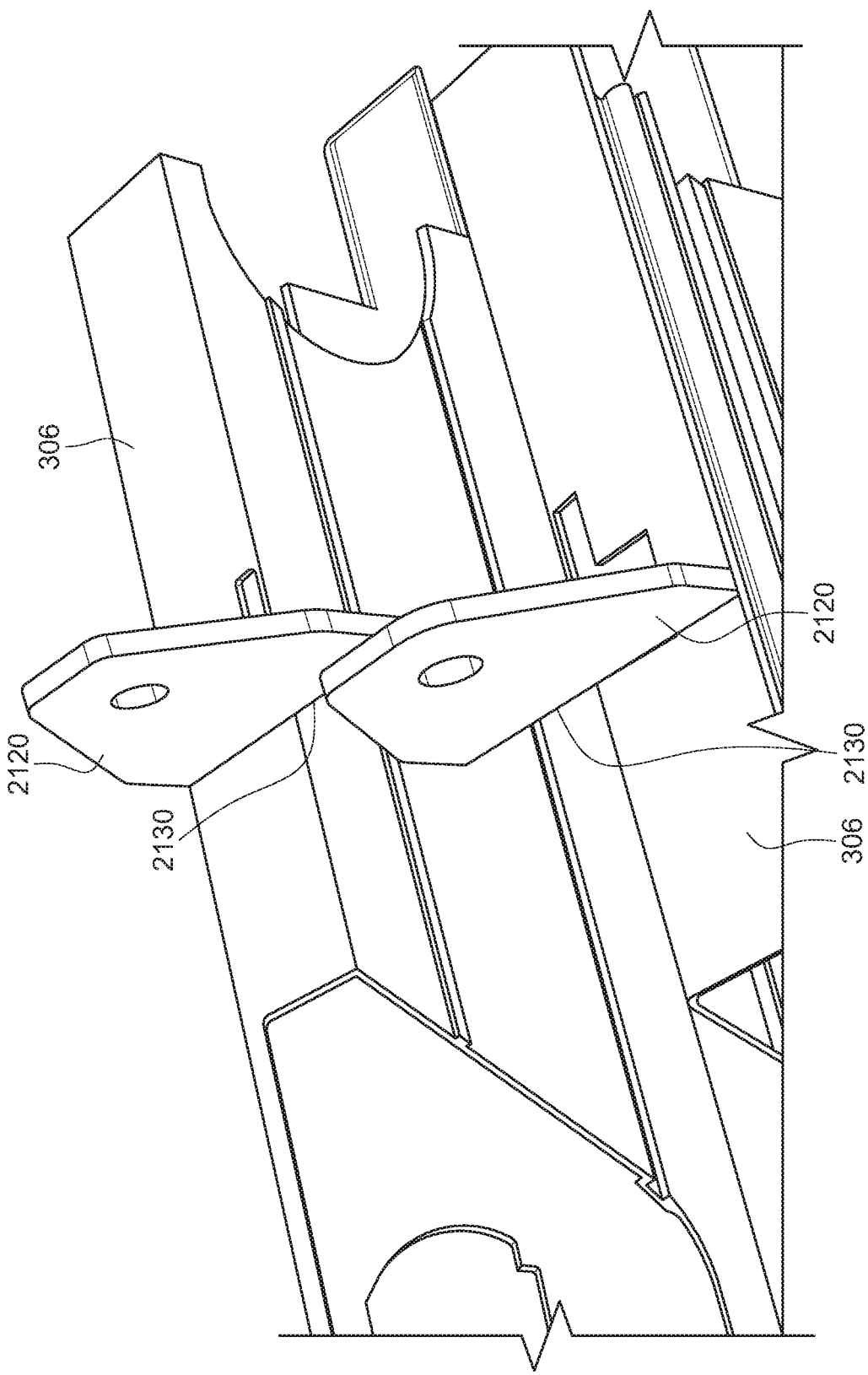
FIG. 21C is a perspective view of two neighboring panels with mounting plates in the side frame members, according to an illustrative embodiment.

FIG. 21C is a perspective view of two neighboring panels with mounting plates in the side frame members, according to an illustrative embodiment. Mounting plates 2120 are shown in FIG. 21C in the second orientation, and a portion of the side frame member 306 is held within the cleft. The two panels can be pressed into engagement with each other, and when the two panels are interlocked, the table 2130 of the mounting plate 2120 in the first panel can be in contact with the second panel, and vice versa, so that each mounting plate 2120 can help to support the weight of both panels.

Figure 21D:
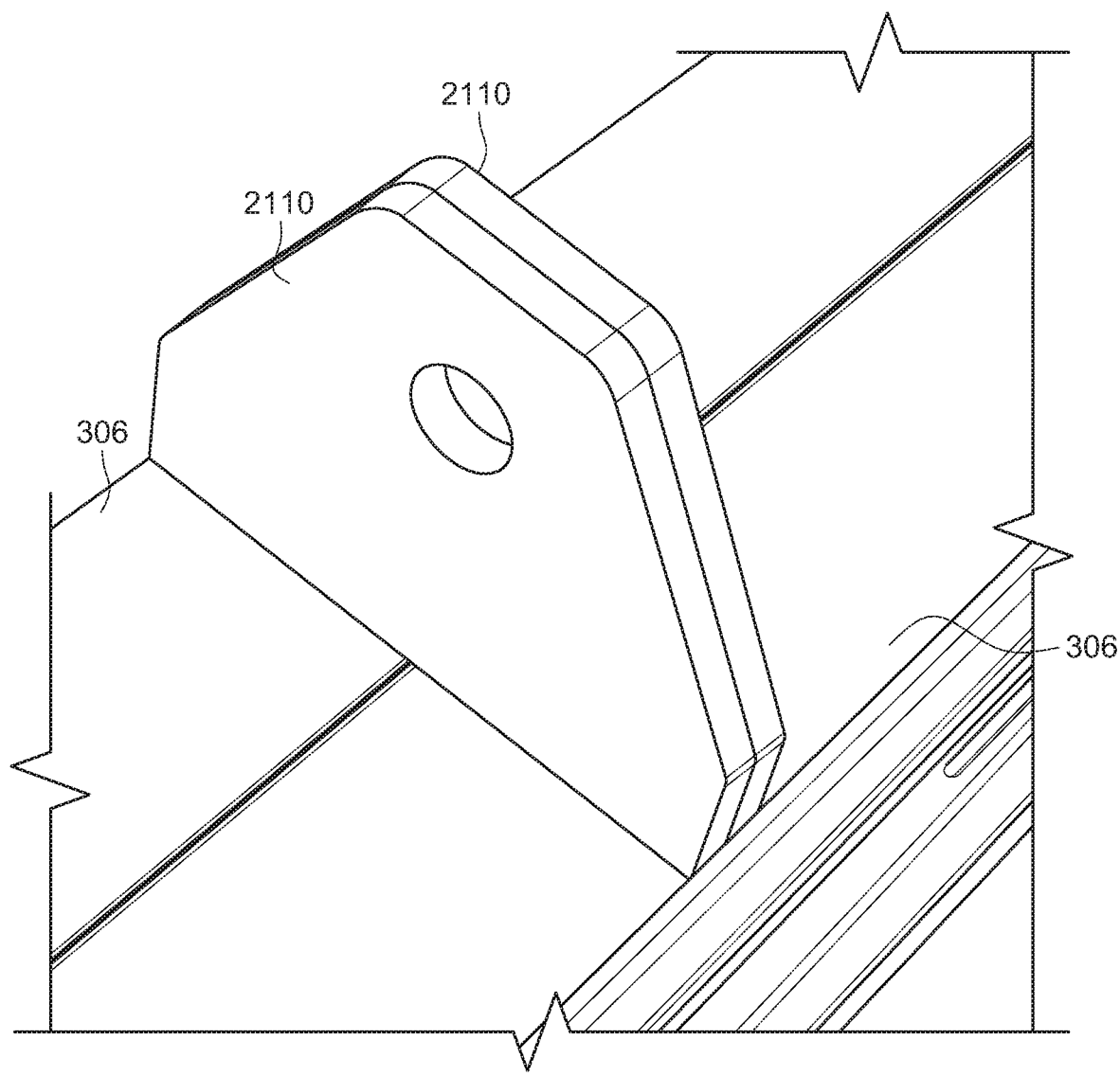
FIG. 21D is a perspective view of two interlocked neighboring panels with mounting plates in the side frame members, according to an illustrative embodiment.

FIG. 21D is a perspective view of two interlocked neighboring panels with mounting plates in the side frame members, according to an illustrative embodiment. The pivoting area of each panel can have a rectangular area, or other shape that allows the mounting plates 2120 to slide along the side frame members 306, so that two the two mounting plates can be slid into abutment and bolted to the purlin together. The mounting plates 2120 together can be slid to one end of the mounting hole, and the exposed portion of the mounting holes 2110 on both panels that are not covered by the mounting plates can be obscured by a roof purlin.

Figure 21E:
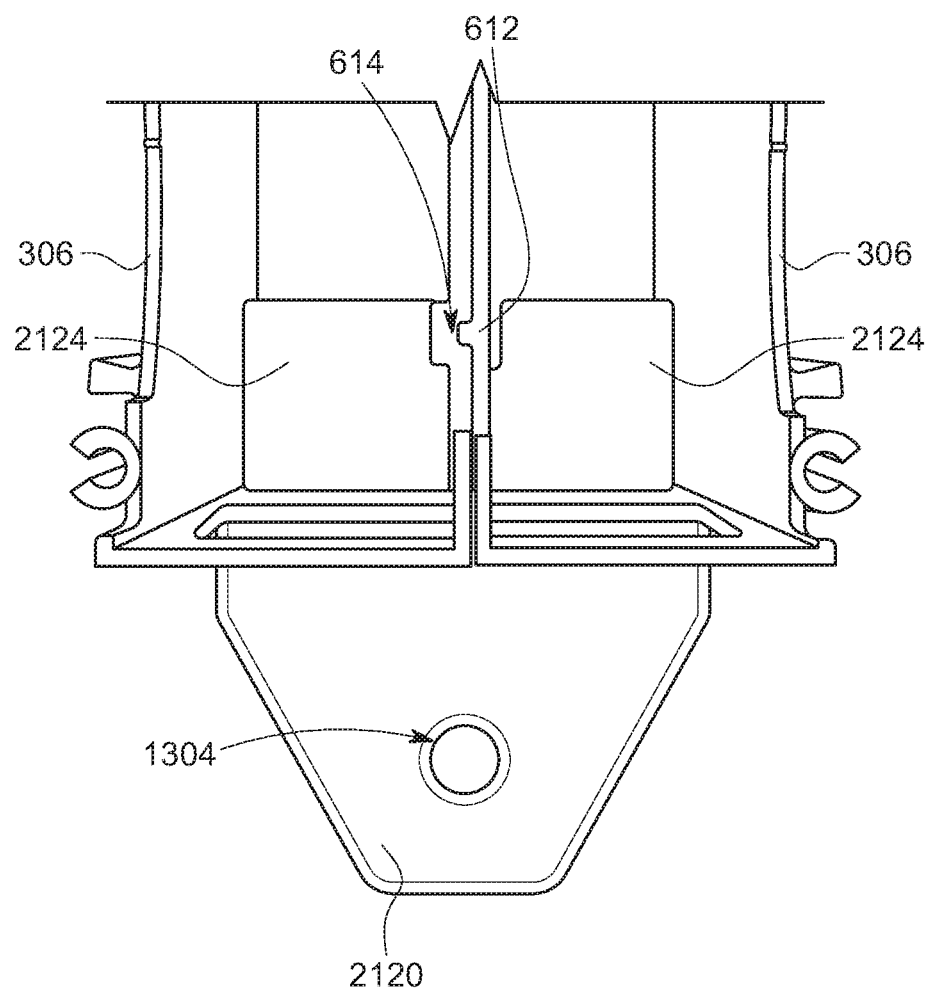
FIG. 21E is an end view of two interlocked side frame members with mounting plates, according to an illustrative embodiment.

FIG. 21E is an end view of two interlocked side frame members with mounting plates, according to an illustrative embodiment. When the two panels are interlocked with the tongue 612 and groove 614 of each side frame member 306 engaged with the corresponding tongue 612 and groove 614 on the neighboring side frame member 306, and when the two mounting plates are in abutment, a single bolt can pass through both bolt holes 1304 and into a roof purlin. The bolt through both bolt holes 1304 can hold the two side frame members 306 in engagement with each other to create a water tight seal between the panels and prevent the panels from separating. Each mounting plate 2120 can provide support for both panels, and each panel can rest on both mounting plate 2120. By holding the side frame member 306 within the cleft, the mounting plate 2120 also prevents the panel from lifting away from the roof purlin during high winds.

Figure 22A:
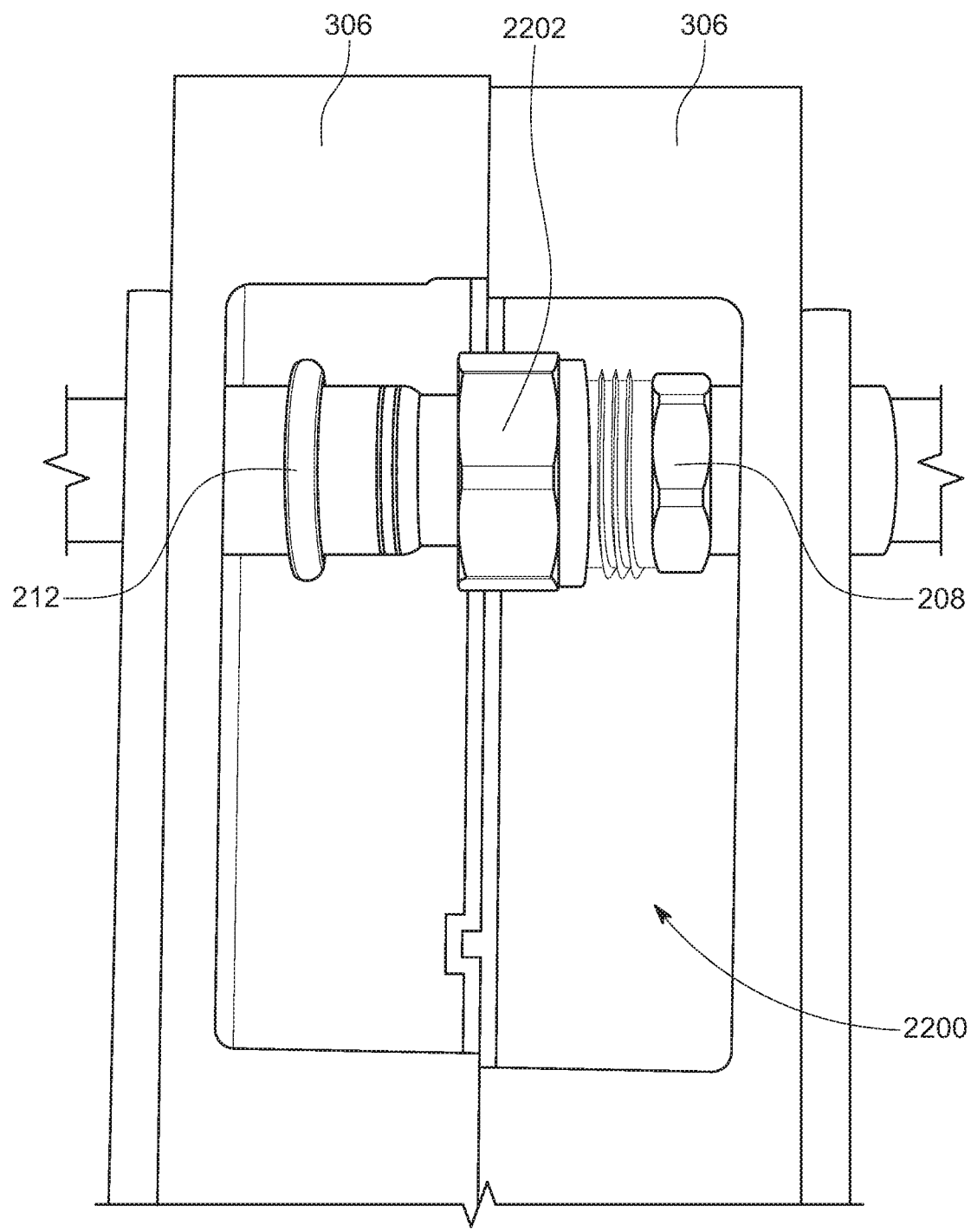
FIG. 22A is a bottom view of two interlocked side frame members with maintenance portals, according to an illustrative embodiment.
Figure 22B:
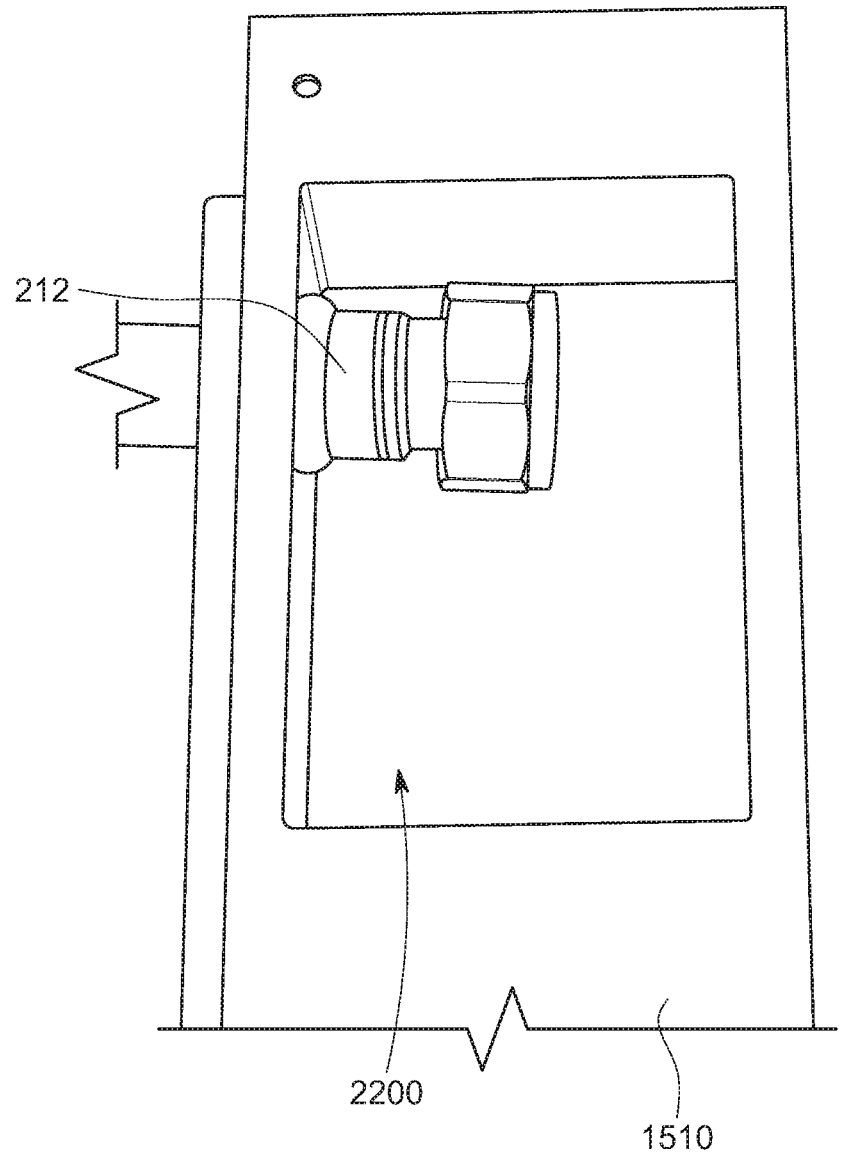
FIG. 22B is a bottom view of a terminal side frame member with a maintenance portal, according to an illustrative embodiment.

FIG. 22A is a bottom view of two interlocked side frame members with maintenance portals, according to an illustrative embodiment. The side frame members 306 can each have an opening in the bottom of the side frame members 306 that can define a maintenance portal 2200. Maintenance portal 2200 can allow a user to access the joint 2202 between an inlet stem 208 and an outlet stem 212, so that a user can connect, tighten, and/or disconnect the joint 2202. A user can use the maintenance portal 2200 to connect the joint 2202 from the inside of the building when installing the panels. FIG. 22B is a bottom view of a terminal side frame member with a maintenance portal, according to an illustrative embodiment. The maintenance portal 2200 of a terminal side frame member 1510 can allow connections from the inlet stem or outlet stem 212 to incoming or outgoing water lines (not shown) that can be carried within the terminal side frame member 1510.

Figure 22C:
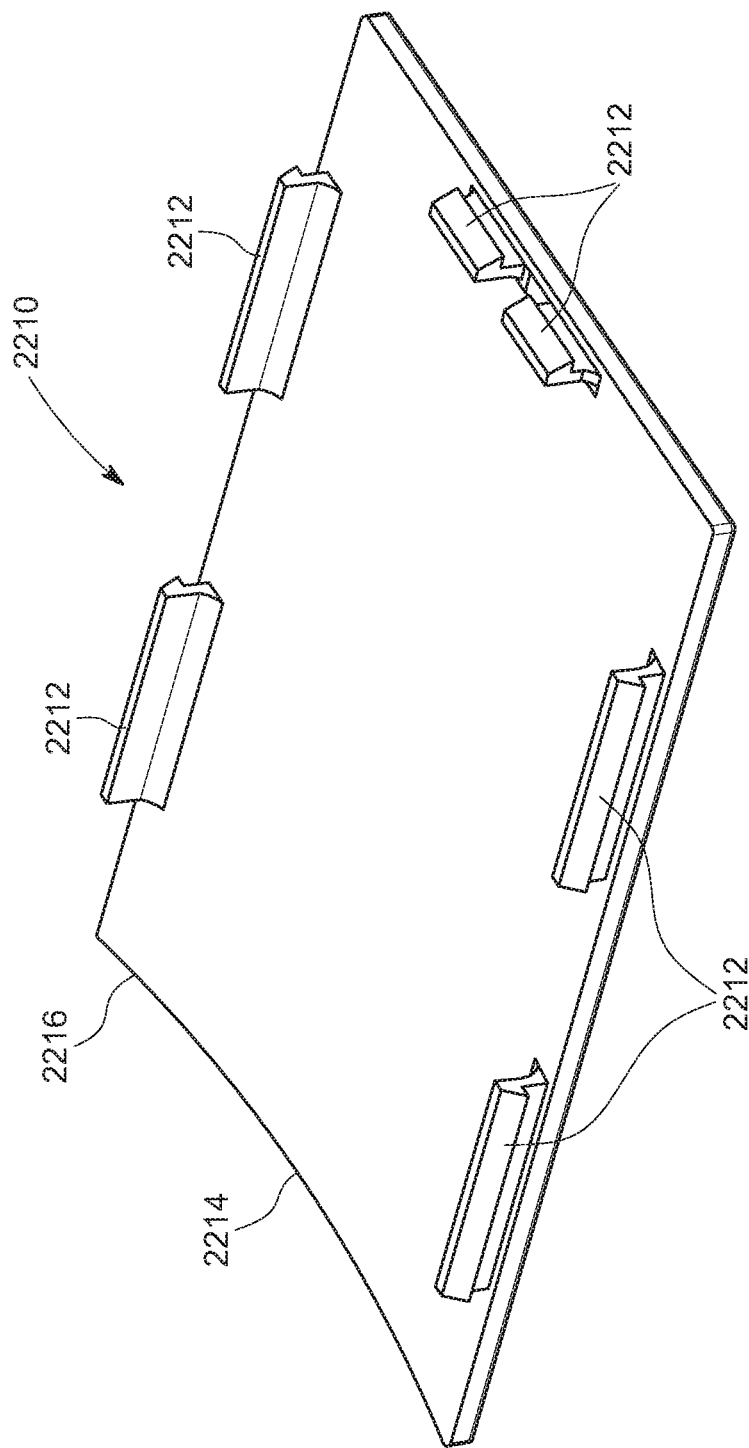
FIG. 22C is a perspective view of a maintenance portal cap, according to an illustrative embodiment.

FIG. 22C is a perspective view of a maintenance portal cap, according to an illustrative embodiment. A maintenance portal cap 2210 can have clips 2212 that can engage with the sides of the maintenance portal 2100 to secure the maintenance portal cap 2210 in place over the maintenance portal 2200. The maintenance portal cap 2210 can allow water to drip down from the maintenance portal cap 2210 if the joint 2202 leaks fluid. The maintenance portal cap 2210 can have a hole, or can have a low point 2214 that can allow water to drip out. Low point 2214 can be a portion of the downhill end 2216 of the maintenance portal cap 2210 that is not in abutment with the panel frame when the cap 2210 is installed over the portal 2200. In various embodiments, the downhill end 2216 can have a curved shape that curves away from the panel, with the low point 2214 in approximately in the middle of the downhill end 2216.

Figure 22D:
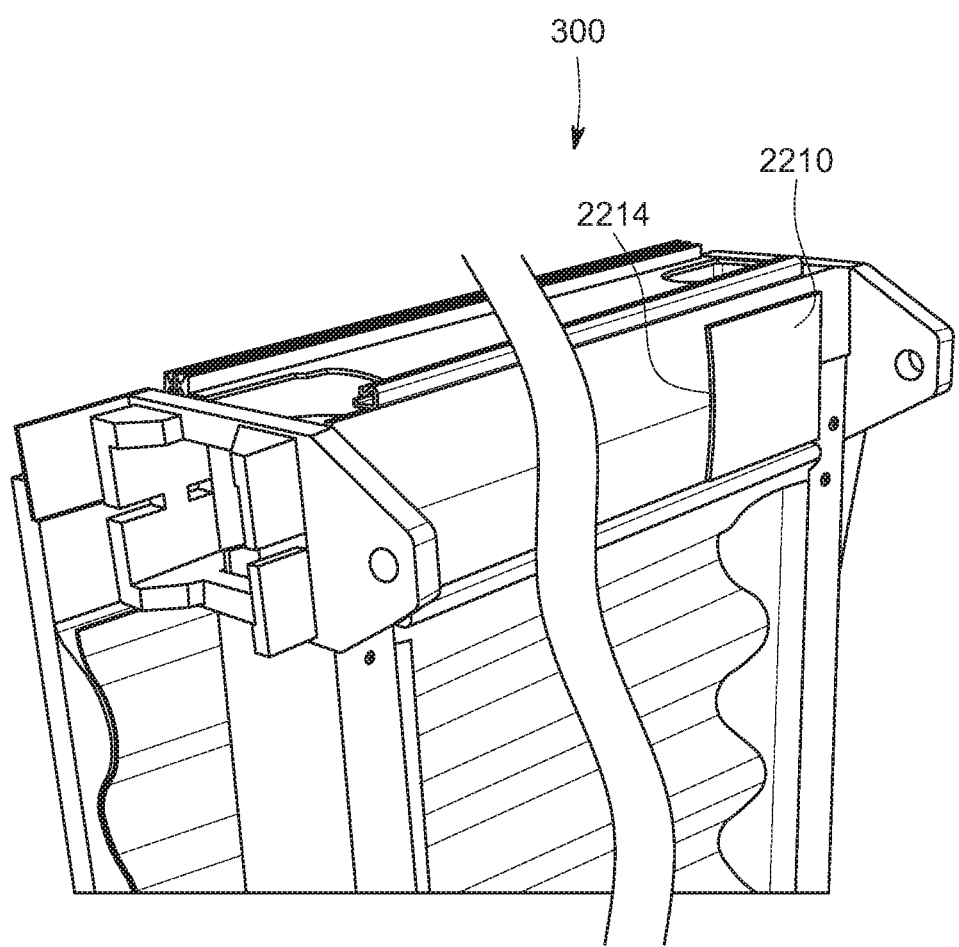
FIG. 22D is a perspective view of a solar fluid heating panel with a terminal side frame member and a maintenance portal cap, according to an illustrative embodiment.

FIG. 22D is a perspective view of a solar fluid heating panel with a terminal side frame member and a maintenance portal cap, according to an illustrative embodiment. The inlet and outlet ports of the panel 300 can be located behind a maintenance portal at the uphill side of the panel, and the portal can be covered with a portal cap 2210. The portal cap 2210 is arranged so that any fluid that leaks from the inlet or outlet port of the panel will drip into the portal cap, and then drip out of a hole or out of the low point 2214. A user can be alerted to a loose joint or a faulty panel by water dripping from the portal cap 2210, and the user can remove the portal cap 2210 to access the loose joint. The portal cap allows the user to know the precise location of leaks immediately, and allows the user to quickly access the joint to perform maintenance and fix leaks.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while panel sections are described as having linear plan view shapes and linear or perpendicular joint connections at corners, it is expressly contemplated that panel sections can have segmented, polygonal or curvilinear plan view shapes and that mounting brackets can allow interconnection of panel sections at non-perpendicular orientations with respect to each other-thereby allowing complex curved or polygonal layouts to be generated. Additionally, it is expressly contemplated that a mounting bracket can have mounting units on only one side of a plate. Likewise, terms such as "top", "bottom", "side", "vertical", and "horizontal", should be taken as conventions with respect to the geometry of the illustrative embodiments, and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. In general, wherein the foregoing reference has been made to integers or components having known equivalents, then such equivalents are herein incorporated as if individually set forth. Accordingly, this description is meant to be taken only by way of example, and not to otherwise limit the scope of this invention.

What is claimed is:

1. A solar fluid heating roof comprising:
   a plurality of panels, the panels comprising:
   a fluid conduit;
   a quadrilateral frame having two side members, the side members having an outer wall, open ends, and a c-channel on an exterior of an inner face;
   a corrugated top sheet; and
   a flashing strip, the flashing strip comprising:
   a ridge, the ridge slidably engaged with the c-channel;
   a frame lip, the frame lip overlaying an upper corner of the side member; and
   a tail, the tail overlaying and contacting a portion of the corrugated top sheet; and
   at least one mounting bracket, the mounting bracket comprising:
   a plate;
   a plurality of top shelves extending outward from the plate, the top shelves engaged within the open ends of side members of panels;
   a plurality of lower feet, the lower feet engaged within the open ends of side members of panels;
   at least one shelf gap between top shelves;
   at least one foot gap between lower feet;
   a mounting hole through the plate; and
   an access hole through the plate between the top shelves and the lower feet; and
   wherein the top shelves on a first mounting bracket are engaged with side members of different panels, and wherein the lower feet on the first mounting bracket are engaged with side members of different panels, and wherein a portion of the ends of the outer walls of two adjacent panels are within the shelf gap and the foot gap of the first mounting bracket.

2. The solar heating roof of claim 1, the mounting bracket further comprising a plurality of sidewalls extending outward from the plate between the top shelves and the lower feet.

3. The solar heating roof of claim 2, wherein the sidewalls define cutouts, the cutouts forming a break in the sidewalls between the top shelves and the feet.

4. The solar heating roof of claim 1, the mounting bracket further comprising four top shelves, a first top shelf and a second top shelf on a first side of the plate, and a third top shelf and fourth top shelf on a second side of the plate.

5. The solar heating roof of claim 1, wherein the flashing strip has a substantially continuous profile from a first end of the flashing strip to a second end of the flashing strip.

6. The solar heating roof of claim 1, wherein the frame lip has a 90-degree channel, and wherein the frame lip contacts two sides of the upper corner of the side frame member.

* * * * *